US012252328B2

(12) United States Patent
Kent et al.

(10) Patent No.: US 12,252,328 B2
(45) Date of Patent: Mar. 18, 2025

(54) DISPENSERS, BLANKS, AND METHODS OF FORMING THE SAME

(71) Applicant: Kimberly-Clark Worldwide, Inc., Neenah, WI (US)

(72) Inventors: Anna Kent, Eau Claire, WI (US); Joseph E. Pierce, Appleton, WI (US); Margaret Kendhammer, La Crosse, WI (US); Jeremy T. Gauger, Greenville, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 123 days.

(21) Appl. No.: 18/192,290

(22) Filed: Mar. 29, 2023

(65) Prior Publication Data

US 2024/0327100 A1 Oct. 3, 2024

(51) Int. Cl.
*B65D 83/08* (2006.01)
*B31B 50/26* (2017.01)
(Continued)

(52) U.S. Cl.
CPC ........ *B65D 83/0805* (2013.01); *B31B 50/262* (2017.08); *B65D 5/0227* (2013.01); *B65D 5/542* (2013.01); *B31B 2100/002* (2017.08)

(58) Field of Classification Search
CPC .. B65D 83/0805; B65D 5/0227; B65D 5/542; B65D 5/725; B65D 83/0894;
(Continued)

(56) References Cited

U.S. PATENT DOCUMENTS

| | | | |
|---|---|---|---|
| 1,674,697 | A | 6/1928 | Olsen |
| 2,101,579 | A | 12/1937 | Hamer |

(Continued)

FOREIGN PATENT DOCUMENTS

| | | |
|---|---|---|
| CN | 303489358 | 12/2015 |
| EP | 0569089 | 11/1993 |

(Continued)

OTHER PUBLICATIONS

Josh Withee, "How can I prevent tissues from falling back into the box?," Lifehacks Stack Exchange, May 18, 2018, accessed via https://lifehacks.stackexchange.com/questions/18642/how-can-i-prevent-tissues-from-falling-back-into-the-box on Oct. 28, 2022, 7 pages.

(Continued)

*Primary Examiner* — Christopher R Demeree
(74) *Attorney, Agent, or Firm* — Meunier Carlin & Curfman LLC

(57) ABSTRACT

Various implementations include dispensers for a plurality of sheets of sheet material that includes at least two adjacent panels that together define a removable surfboard, wherein the two adjacent panels are joined together via a fold line. Various implementations also include blanks that can be folded into the dispensers and methods of assembling the same. In some implementations, the removable surfboard has a length of about 60% to about 80% of a length of the fold line. In addition, the removable surfboard has a medial portion and lateral portions disposed on opposite sides of the medial portion. The lateral portions defined by the first panel have a width that is greater than a width of the medial portion defined by the first panel. Additionally, in some implementations, the shape of the removable surfboard contributes to a unique look for the dispensers and the blanks.

26 Claims, 20 Drawing Sheets

(51) Int. Cl.

| | |
|---|---|
| ***B65D 5/02*** | (2006.01) |
| ***B65D 5/54*** | (2006.01) |
| *B31B 100/00* | (2017.01) |

(58) Field of Classification Search

CPC .... B65D 83/08; B65D 5/541; B65D 83/0811; B65D 83/0835; B65D 83/0817; A47K 10/42; A47K 10/421; A47K 2010/3266

USPC ...... 229/124, 242, 237; 221/48, 63, 302, 45; 206/494, 233, 804

See application file for complete search history.

(56) References Cited

U.S. PATENT DOCUMENTS

| | | | | |
|---|---|---|---|---|
| D134,733 | S | 1/1943 | Farrel | |
| 3,207,361 | A | 9/1965 | Marcalus | |
| 4,044,919 | A | 8/1977 | Olson | |
| 4,574,952 | A * | 3/1986 | Masui | B65D 83/0835 221/48 |
| 4,623,074 | A | 11/1986 | Dearwester | |
| 5,509,570 | A | 4/1996 | DeMatteis | |
| 5,516,001 | A | 5/1996 | Muckenfuhs et al. | |
| 6,460,703 | B1 | 10/2002 | Thompson et al. | |
| 8,371,445 | B2 | 2/2013 | Seabaugh et al. | |
| D689,769 | S | 9/2013 | Oates et al. | |
| D740,114 | S | 10/2015 | Sanfilippo et al. | |
| D747,646 | S | 1/2016 | Sanfilippo et al. | |
| D787,319 | S | 5/2017 | Sanfilippo et al. | |
| 9,878,829 | B2 | 1/2018 | Tan | |
| 10,239,652 | B2 * | 3/2019 | Vanderhulst | B65D 85/18 |
| D854,925 | S | 7/2019 | Fath | |
| 10,364,090 | B2 | 7/2019 | DeMatteis et al. | |
| 11,203,460 | B2 * | 12/2021 | Hokanson | B65D 5/5495 |
| D1,005,844 | S | 11/2023 | Li | |
| 2002/0108962 | A1 | 8/2002 | Mangin | |
| 2007/0233031 | A1 | 10/2007 | Benson et al. | |
| 2013/0228588 | A1 | 9/2013 | Biegger | |
| 2014/0319205 | A1 * | 10/2014 | Schultz | B65D 5/0245 229/122.1 |
| 2015/0196175 | A1 | 7/2015 | Ruthven et al. | |
| 2022/0000323 | A1 | 1/2022 | Yoshida | |

FOREIGN PATENT DOCUMENTS

| | | | |
|---|---|---|---|
| JP | 2011246192 | A | 12/2011 |
| JP | 2013166593 | A | 8/2013 |
| NZ | 411623-0001 | | 2/2009 |
| WO | 2009017268 | A1 | 2/2009 |
| WO | 2013134183 | A1 | 9/2013 |
| WO | 2021153386 | A1 | 8/2021 |

OTHER PUBLICATIONS

Amazon.com: FlashDry Oil Absorbent Pads. Date first available: Jan. 8, 2024. Site visited Jul. 15, 2024. Available online: https://www.amazon.com/dp/B0CRRFGRWR/ref=sspa_dk_detail_3 (Year: 2024).

Kimberly Clark; 09107 Quaterfold Wiper Dispenser. Date first available: 2024. Site visited: 07/115/2024. Available online: https://www.actionis.com/kimberly-clark-09107-quaterfold-wiper-dispenser-7-1-2-in-l-x-7-1-2-in-w-x-9-in-h-counter-mount-plastic-gray (Year: 2024).

PoopShark Paper Poop Bags—Dispenser Box. Date first available: Dec. 7, 2023. Site visited: Jul. 15, 2024. Available online: https://poopshark.com/collections/shop-page/products/poopshark-paper-poop-bags-dispenser-box? (Year: 2023).

* cited by examiner

DISPENSERS, BLANKS, AND METHODS OF FORMING THE SAME

BACKGROUND

Existing consumer product dispensers, such as dispensers for folded and stacked sheets of sheet material, such as facial tissues, paper towels, or shop towels, present a variety of problems to consumers. For example, if a length and/or width of the dispenser opening is too small, the user may need to use one hand to pull the tissue from the opening and the other hand to hold the dispenser from lifting off the surface on which the dispenser is disposed. If the length and/or width of the dispenser opening is too large, multiple tissues may be pulled together and/or tissues are more likely to fall back into the dispenser.

In addition, for dispensers in which the dispenser opening is defined on the front panel or the top panel, the panel opposite the panel that defines the opening must be disposed on a support surface, limiting the orientation of the dispenser on the support surface.

Furthermore, known dispensers include a polymer baffle over the dispenser opening. The polymer baffle has been used to prevent sheets from falling back into the dispenser until the next sheet is taken from the dispenser without causing tearing of the sheets when they are pulled from the dispenser opening. However, the polymer baffle is separately made and adhered to the dispenser, which requires extra manufacturing steps and materials, and the baffle must be removed prior to recycling the dispenser.

As yet another example, when the number of sheets in the dispenser becomes low, it can become more difficult for the user to access the remaining sheets within the dispenser. The next sheet dispensed may fail to pull another sheet with it, requiring the user to reach into the dispenser to pull out the next sheet, which becomes more difficult as the stack of sheets within the dispenser gets lower.

Consumers have grown accustomed to rectangular prism-shaped dispensers with a predictable set of opening shapes. Thus, there is little differentiation among brands from one dispenser to another. Little innovation has been made with respect to product image and how to make the look of dispensers unique.

Therefore, a need exists for a consumer product dispenser that increases recyclability, prevents fall back and improves access to sheets within the dispenser, presents a unique look to consumers, allows the dispenser to be used with one hand, and has the option of orienting the rear panel or the bottom panel on the support surface.

SUMMARY

Some aspects of the present disclosure relate to a dispenser for a plurality of stacked sheet-like products. Some aspects relate to a dispenser that defines a dispenser opening that can hold the product within the dispenser opening and prevent the product from falling back into the dispenser. Some aspects relate to a dispenser that defines a dispenser opening that is dimensioned and/or shaped to prevent the dispenser from being lifted off a support surface when a product is pulled from the dispenser opening and reduces the likelihood of two or more products being dispensed at once. Some aspects relate to a dispenser that defines a dispenser opening that allows access to the product that has fallen back into the cavity. Some aspects relate to a dispenser than defines a dispenser opening on two adjacent panels of the dispenser to provide flexibility as to which surface of the dispenser rests on a support surface.

According to some aspects, the dispenser is for housing a plurality of sheets of sheet material. The dispenser includes a plurality of panels that define a cavity into which the sheets are disposed. The plurality of panels include a first panel and a second panel folded relative to each other along at least one fold line. The first panel and the second panel include at least one removable surfboard that extends between the first and second panels over the at least one fold line. The removable surfboard has a length along the fold line of about 60% to about 80% of a length of the fold line. The removable surfboard has a medial portion and lateral portions disposed on opposite sides of the medial portion. The lateral portions defined by the first panel have a width that is greater than a width of the medial portion defined by the first panel.

In some aspects, in addition or in the alternative to any preceding aspects, the removable surfboard is defined by a perforated or weakened line on the first panel and second panel.

In some aspects, in addition or in the alternative to any preceding aspects, the removable surfboard extends over a dispenser opening defined by the first panel and the second panel. The dispenser opening is in communication with the cavity, and a shape of the removable surfboard is coincident with a shape of the dispenser opening.

In some aspects, in addition or in the alternative to any preceding aspects, the length of the removable surfboard along the fold line is about 70% to about 80% of the length of the fold line.

In some aspects, in addition or in the alternative to any preceding aspects, a maximum width of a portion of the removable surfboard defined by the first panel is about 35% to about 60% of a width of the first panel.

In some aspects, in addition or in the alternative to any preceding aspects, the maximum width of the portion of the removable surfboard defined by the first panel is about 40% to about 56% of the width of the first panel.

In some aspects, in addition or in the alternative to any preceding aspects, a maximum width of the lateral portions defined by the first panel is about 2 to about 3.5 times wider than a minimum width of the medial portion defined by the first panel.

In some aspects, in addition or in the alternative to any preceding aspects, the removable surfboard is chevron shaped when removed from the dispenser and laid flat, wherein the medial portion defined by the first panel is arcuate shaped and extends toward the fold line, and a medial portion defined by the second panel is arcuate shaped and extends away from the fold line.

In some aspects, in addition or in the alternative to any preceding aspects, the removable surfboard is peanut shaped when removed from the dispenser and laid flat, wherein a central longitudinal axis of the peanut shaped removable surfboard coincides with the fold line, the medial portion defined by the first panel and a medial portion defined by the second panel are arcuate shaped portions that extend toward the fold line, and the lateral portions defined by the first panel and lateral portions defined by the second panel are arcuate shaped portions that extend away from the fold line.

In some aspects, in addition or in the alternative to any preceding aspects, a portion of the removable surfboard defined by the second panel is trapezoidal or rectangular shaped, and the lateral portions defined by the first panel are triangular shaped, wherein an apex of each triangular shaped lateral portion is spaced apart from the fold line and has a width as measured from the fold line that is greater than a width of the medial portion defined by the first panel. In certain aspects, the medial portion defined by the first panel is rectangular shaped.

In some aspects, in addition or in the alternative to any preceding aspects, the first panel is a front panel, and the second panel is a top panel, and the dispenser further comprises a rear panel opposite the front panel and extending from an opposite edge of the top panel; a bottom panel opposite the top panel and extending between opposite edges of the front panel and the rear panel than the top panel; first side flaps that extend from the front panel and the rear panel and overlap each other to at least partially enclose a first side of the dispenser; and second side flaps that extend from the front panel and the rear panel and overlap each other to at least partially enclose a second side of the dispenser, the first side and the second side of the dispenser being opposite from each other.

In some aspects, in addition or in the alternative to any preceding aspects, the panels are rectangular shaped.

In some aspects, in addition or in the alternative to any preceding aspects, the dispenser is free of a polymer baffle.

In some aspects, a blank for a dispenser for a plurality of sheets of sheet material includes a plurality of panels, including a first panel and a second panel that are coupled to each other along at least one fold line. The first panel and the second panel include at least one removable surfboard that extends between the first panel and the second panel over the at least one fold line. The removable surfboard has a length along the fold line of about 60% to about 80% of a length of the fold line, and the removable surfboard has a medial portion and lateral portions disposed on opposite sides of the medial portion. The lateral portions defined by the first panel have a width that is greater than a width of the medial portion defined by the first panel.

In some aspects, in addition or in the alternative to any preceding aspects, the removable surfboard is defined by a perforated or weakened line on the first panel and second panel.

In some aspects, in addition or in the alternative to any preceding aspects, the length of the removable surfboard is about 70% to about 80% of the length of the fold line.

In some aspects, in addition or in the alternative to any preceding aspects, a maximum width of a portion of the removable surfboard defined by the first panel is about 35% to about 60% of a width of the first panel.

In some aspects, in addition or in the alternative to any preceding aspects, the maximum width of the portion of the removable surfboard defined by the first panel is about 40% to about 56% of the width of the first panel.

In some aspects, in addition or in the alternative to any preceding aspects, a maximum width of the lateral portions defined by the first panel is about 2 to about 3.5 times wider than a minimum width of the medial portion defined by the first panel.

In some aspects, in addition or in the alternative to any preceding aspects, the removable surfboard is chevron shaped, wherein the medial portion defined by the first panel is arcuate shaped and extends toward the fold line, and a medial portion defined by the second panel is arcuate shaped and extends away from the fold line.

In some aspects, in addition or in the alternative to any preceding aspects, the removable surfboard is peanut shaped, wherein a central longitudinal axis of the peanut shaped removable surfboard coincides with the fold line, the medial portion defined by the first panel and a medial portion defined by the second panel are arcuate shaped portions that extend toward the fold line, and the lateral portions defined by the first panel and lateral portions defined by the second panel are arcuate shaped portions that extend away from the fold line.

In some aspects, in addition or in the alternative to any preceding aspects, a portion of the removable surfboard defined by the second panel is trapezoidal or rectangular shaped, and the lateral portions defined by the first panel are triangular shaped, wherein an apex of each triangular shaped lateral portion is spaced apart from the fold line and extends in a direction normal to the fold line. In certain aspects, the medial portion defined by the first panel is rectangular shaped.

In some aspects, in addition or in the alternative to any preceding aspects, the first panel is a front panel, the second panel is a top panel, and the fold line is a first fold line, the blank further comprises a rear panel extending from the top panel along a second fold line that is opposite and spaced apart from the first fold line, a bottom panel extending from the front panel along a third fold line that is opposite and spaced apart from the first fold line, and first and second front panel side flaps that extend from each side of the front panel and first and second rear panel side flaps that extend from each side of the rear panel.

In some aspects, in addition or in the alternative to any preceding aspects, the panels are rectangular shaped.

According to some aspects, the dispenser is for housing a plurality of sheets of sheet material. The dispenser includes a plurality of panels that define a cavity into which the sheets are disposed. The plurality of panels include a first panel and a second panel folded relative to each other along at least one fold line. The first panel and the second panel define a dispenser opening that extends between the first and second panels. The dispenser opening has a length along the fold line of about 60% to about 80% of a length of the fold line. The dispenser opening has a medial portion and lateral portions disposed on opposite sides of the medial portion. The lateral portions defined by the first panel have a width that is greater than a width of the medial portion defined by the first panel.

In some aspects, in addition or in the alternative to any preceding aspects, the length of the dispenser opening along the fold line is about 70% to about 80% of the length of the fold line.

In some aspects, in addition or in the alternative to any preceding aspects, a maximum width of a portion of the dispenser opening defined by the first panel is about 35% to about 60% of a width of the first panel.

In some aspects, in addition or in the alternative to any preceding aspects, the maximum width of the portion of the dispenser opening defined by the first panel is about 40% to about 56% of the width of the first panel.

In some aspects, in addition or in the alternative to any preceding aspects, a maximum width of the lateral portions defined by the first panel is about 2 to about 3.5 times wider than a minimum width of the medial portion defined by the first panel.

In some aspects, in addition or in the alternative to any preceding aspects, the medial portion defined by the first panel is arcuate shaped and extends toward the fold line, and a medial portion defined by the second panel is arcuate shaped and extends away from the fold line.

In some aspects, in addition or in the alternative to any preceding aspects, a central longitudinal axis of the dispenser opening coincides with the fold line, the medial portion defined by the first panel and a medial portion defined by the second panel are arcuate shaped portions that extend toward the fold line, and the lateral portions defined by the first panel and lateral portions defined by the second panel are arcuate shaped portions that extend away from the fold line.

In some aspects, in addition or in the alternative to any preceding aspects, a portion of the dispenser opening defined by the second panel is trapezoidal or rectangular shaped, and the lateral portions defined by the first panel are triangular shaped, wherein an apex of each triangular shaped lateral portion is spaced apart from the fold line and has a width as measured from the fold line that is greater than a width of the medial portion defined by the first panel. In certain aspects, the medial portion defined by the first panel is rectangular shaped.

In some aspects, in addition or in the alternative to any preceding aspects, the first panel is a front panel, and the second panel is a top panel, and the dispenser further comprises a rear panel opposite the front panel and extending from an opposite edge of the top panel; a bottom panel opposite the top panel and extending between opposite edges of the front panel and the rear panel than the top panel; first side flaps that extend from the front panel and the rear panel and overlap each other to at least partially enclose a first side of the dispenser; and second side flaps that extend from the front panel and the rear panel and overlap each other to at least partially enclose a second side of the dispenser, the first side and the second side of the dispenser being opposite from each other.

In some aspects, in addition or in the alternative to any preceding aspects, the panels are rectangular shaped.

In some aspects, in addition or in the alternative to any preceding aspects, the dispenser is free of a polymer baffle.

In some aspects, in addition or in the alternative to any preceding aspects, a removable surfboard extends over the dispenser opening prior to use of the dispenser and a shape of the removable surfboard is coincident with a shape of the dispenser opening. In other aspects, the removable surfboard has a shape that is different than the shape of the dispenser opening.

BRIEF DESCRIPTION OF DRAWINGS

The above aspects and other features, aspects, and advantages of the present disclosure will become better understood with regard to the following description, appended claims, and accompanying drawings in which:

DETAILED DESCRIPTION

Figure 1:
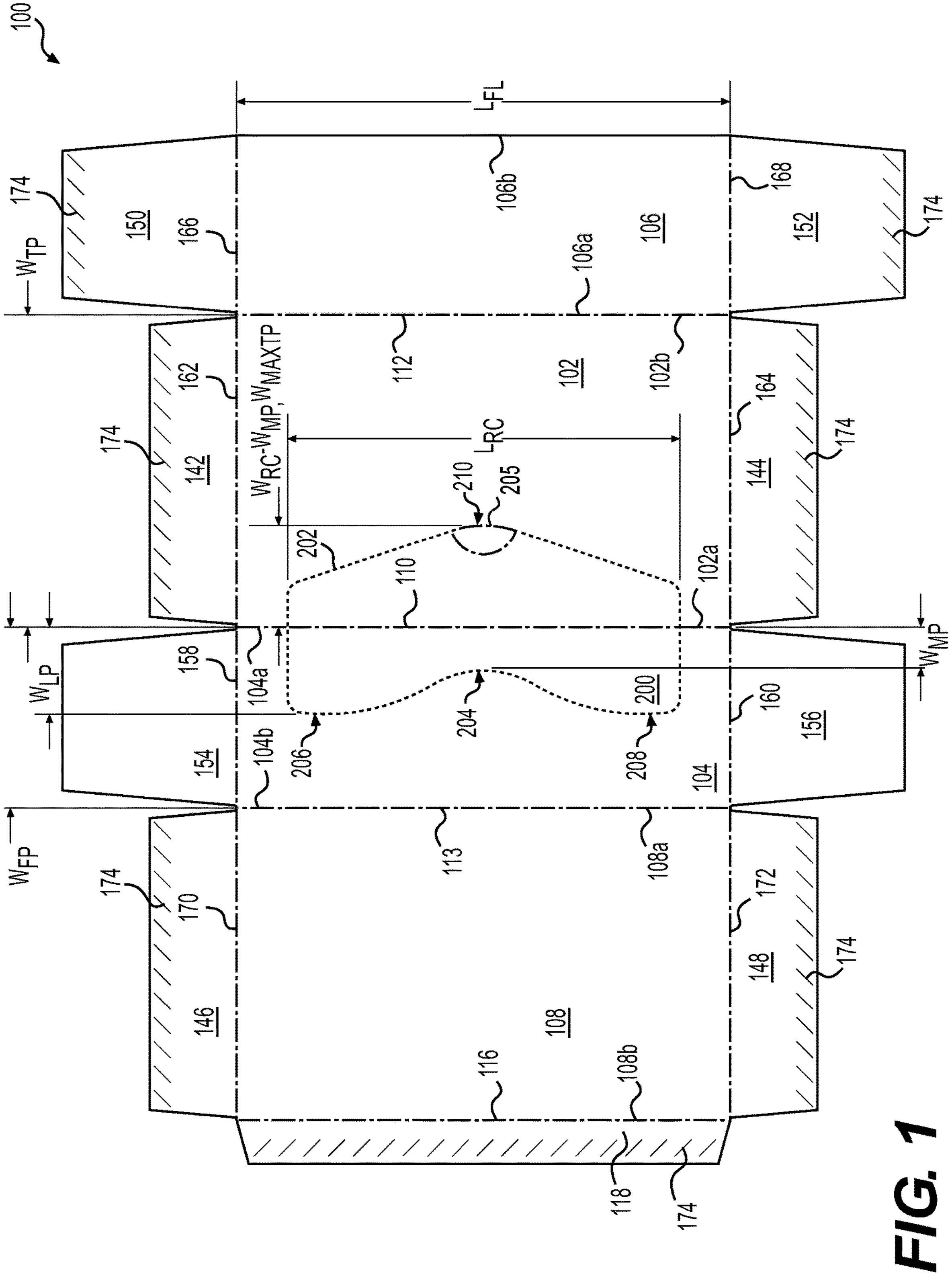
FIG. 1 shows a plan view of a blank for a dispenser, according to a first implementation.
Figure 2:
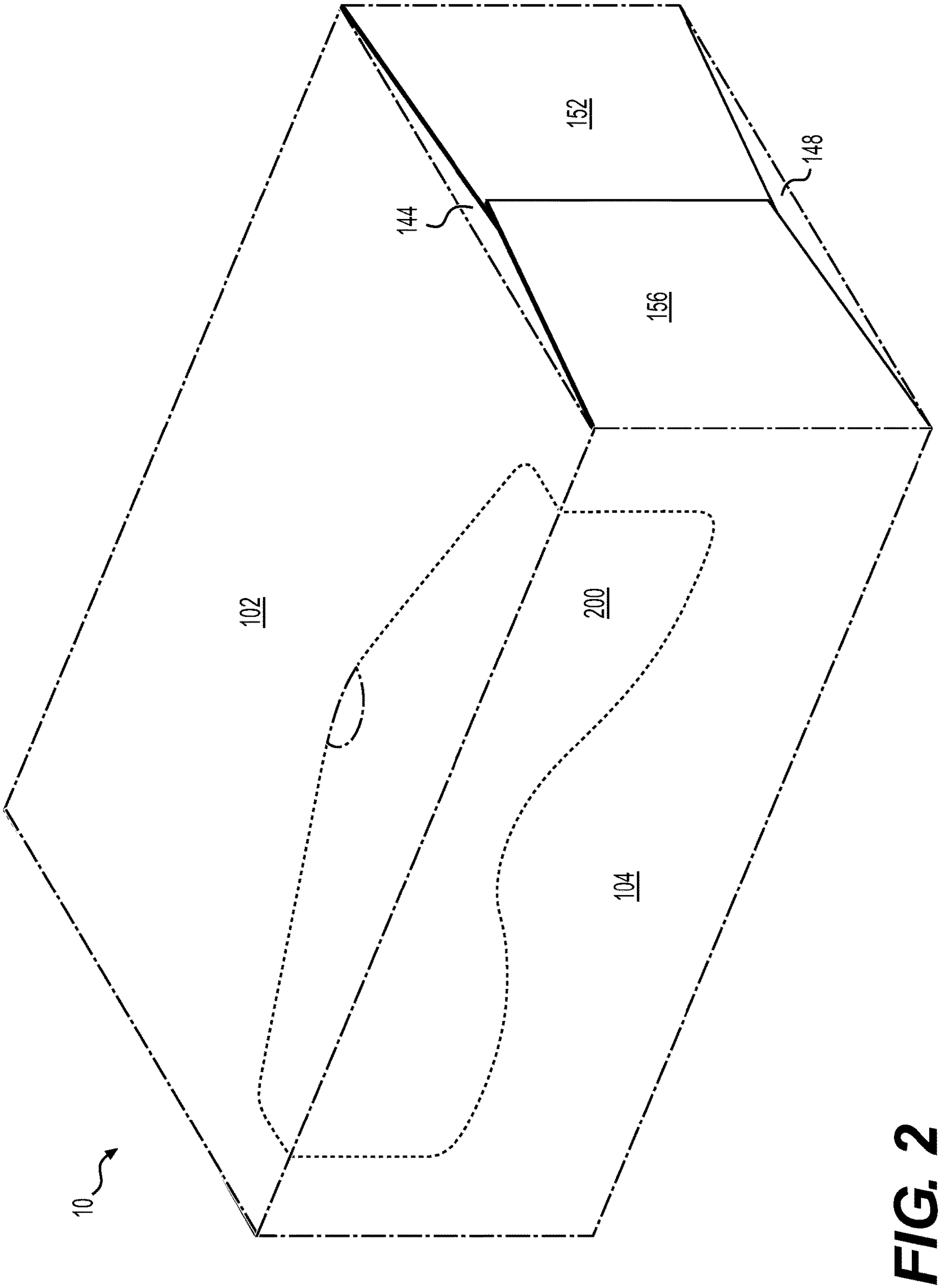
FIG. 2 shows a perspective view of a dispenser assembled from the blank in FIG. 1.
Figure 3:
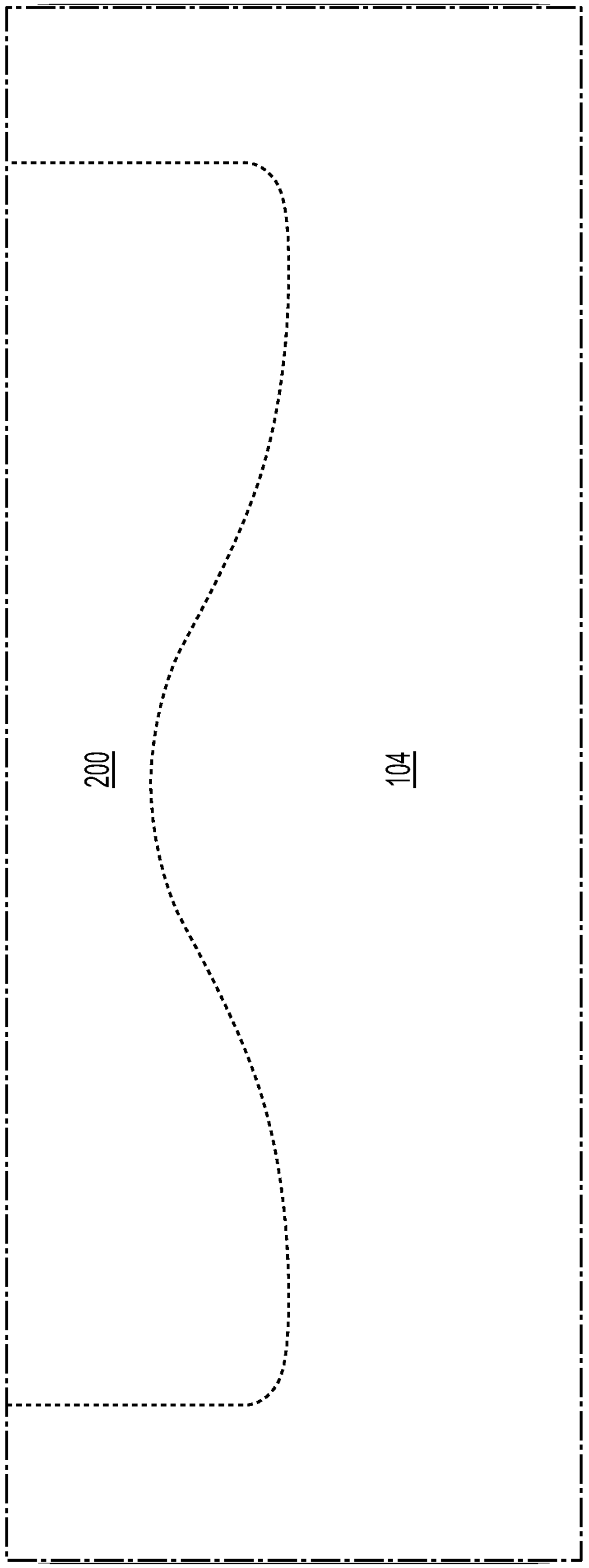
FIG. 3 shows a front view of the dispenser in FIG. 2.
Figure 4:
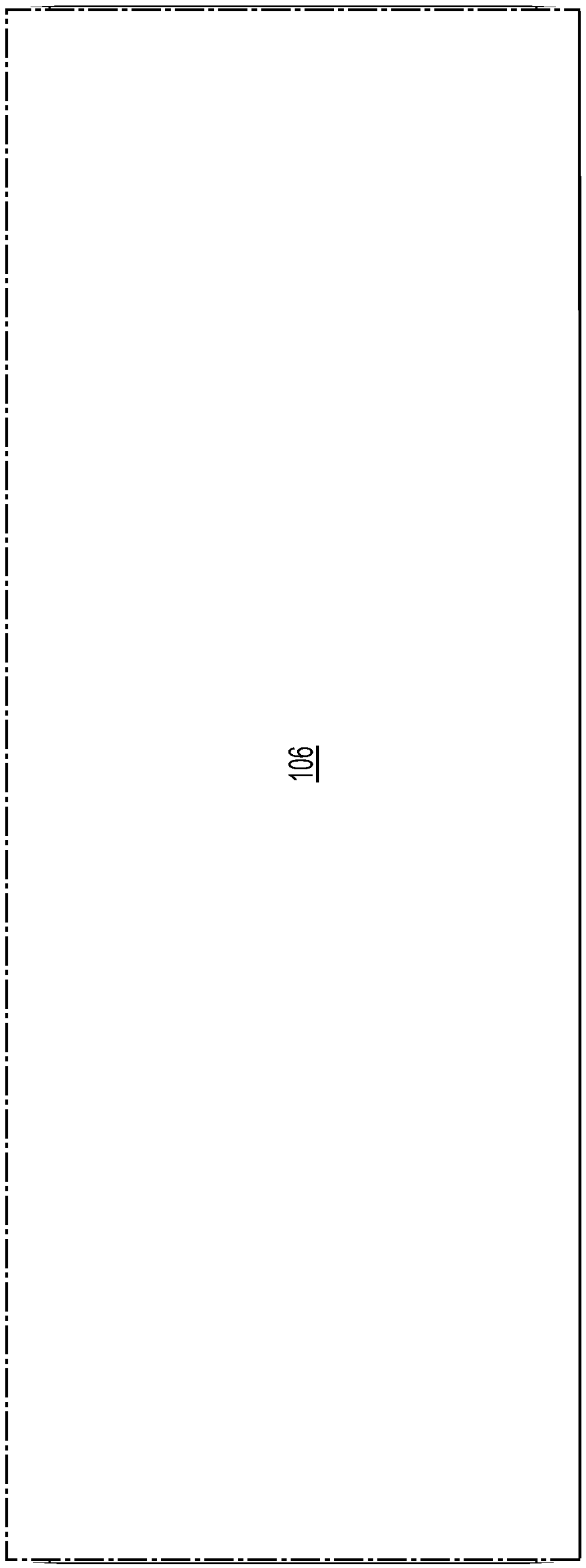
FIG. 4 shows a rear view of the dispenser in FIG. 2.
Figure 5:
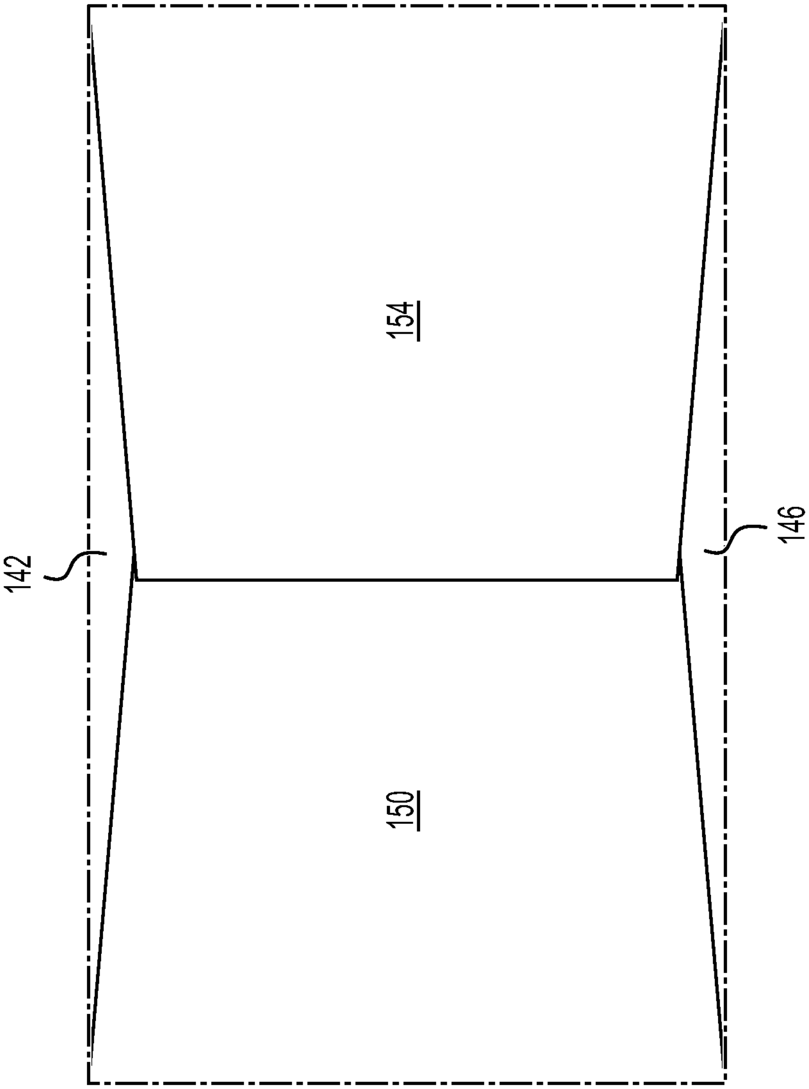
FIG. 5 shows a left side view of the dispenser in FIG. 2.
Figure 6:
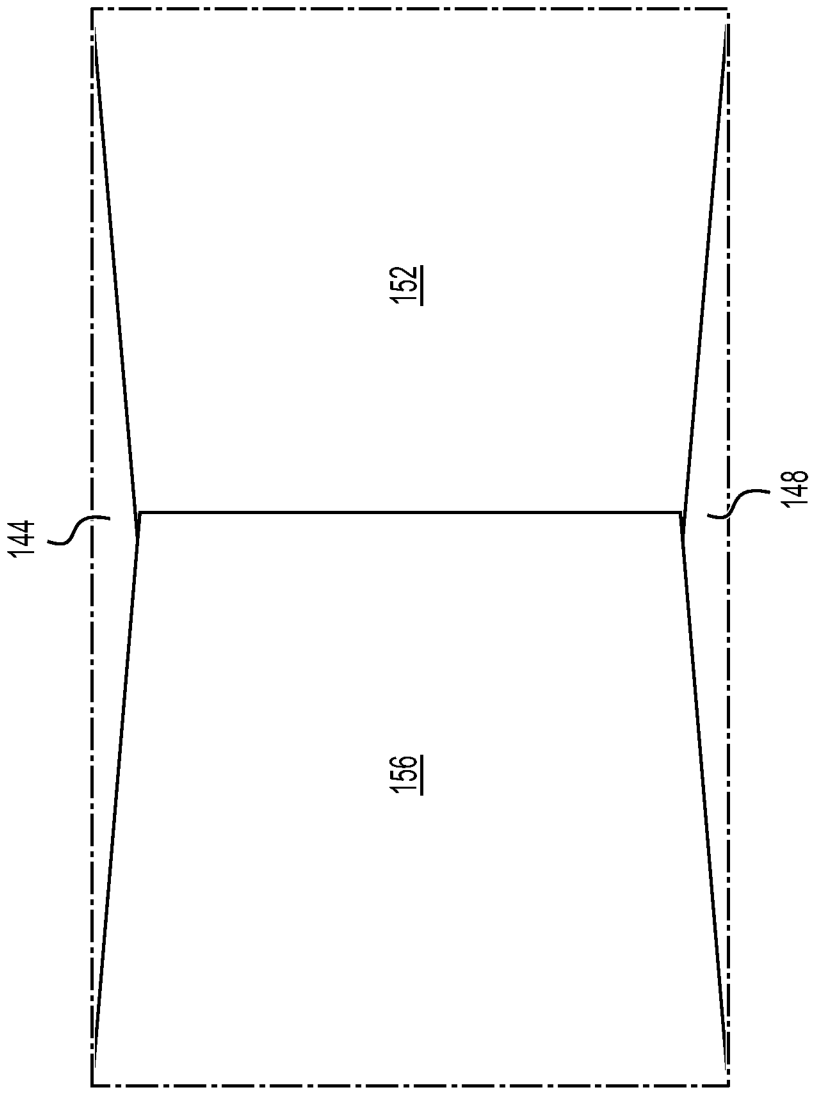
FIG. 6 shows a right side view of the dispenser in FIG. 2.
Figure 7:
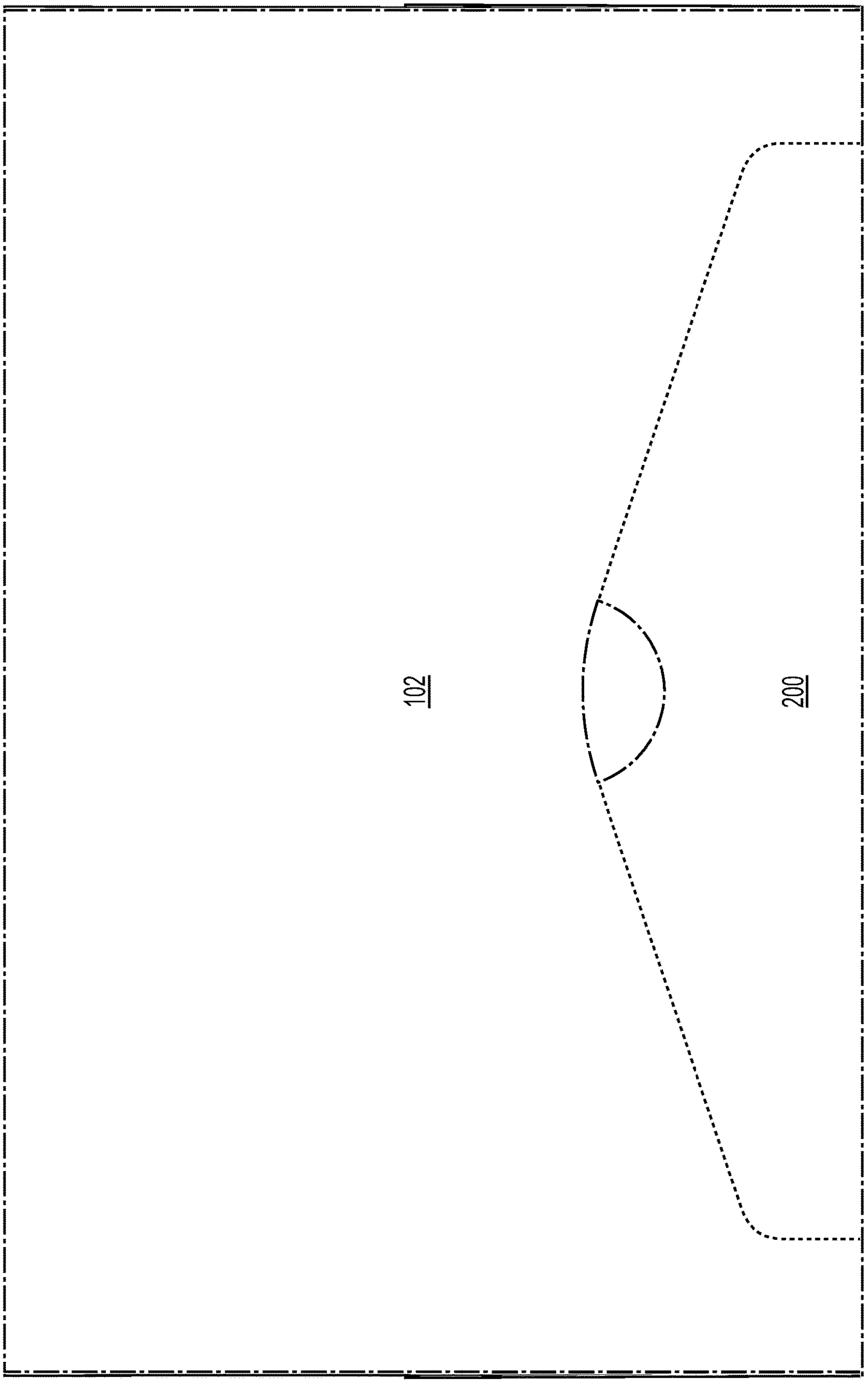
FIG. 7 shows a top view of the dispenser in FIG. 2.
Figure 8:
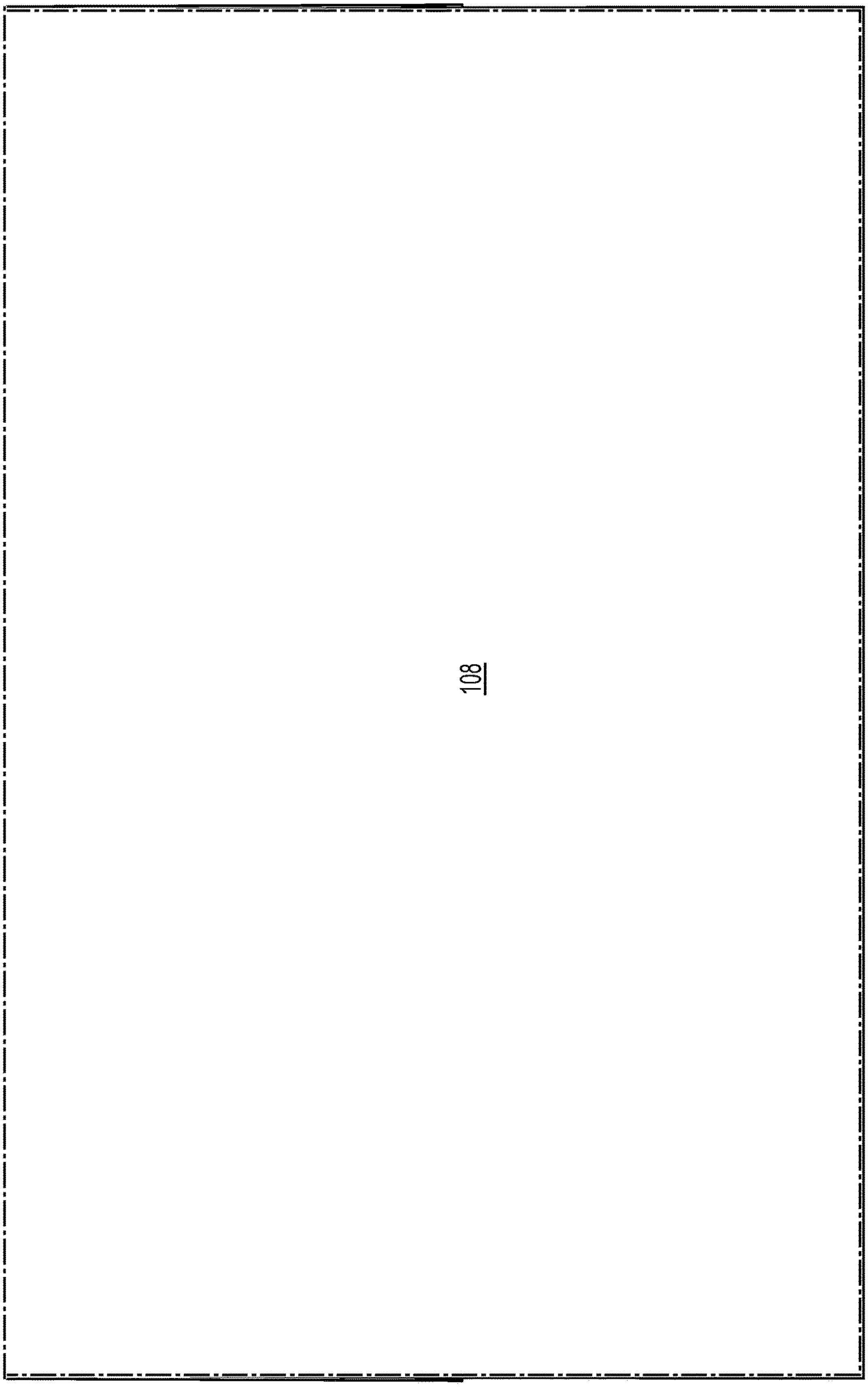
FIG. 8 shows a bottom view of the dispenser in FIG. 2.

As used in the specification, and in the appended claims, the singular forms "a," "an," and "the" include plural referents unless the context clearly dictates otherwise. The terms "comprising," "having," and "including" and variations thereof as used herein are used synonymously and are open, non-limiting terms. Therefore, additional non-recited elements, functions, steps or limitations may be present in addition to the recited elements, functions, steps, or limitations.

As used herein, "sheet material" is a flexible substrate, which is useful for household chores, cleaning, personal care, health care, food wrapping, and cosmetic application or removal. Non-limiting examples of suitable substrates for use with the dispenser include nonwoven substrates, woven substrates, hydro-entangled substrates, air-entangled substrates, paper substrates comprising cellulose (such as tissue paper, toilet paper, or paper towels), waxed paper substrates, coform substrates comprising cellulose fibers and polymer fibers, wet substrates such as wet wipes, moist cleaning wipes, moist toilet paper wipes, baby wipes, film, or plastic substrates (such as those used to wrap food), shop towels, and metal substrates such as aluminum foil. Furthermore, laminated or plied together substrates of two or more layers of any of the preceding substrates are also suitable.

As used here, "fold line" is a line of weakness, which may be continuous or discontinuous, disposed on the dispenser or blank for forming the same. Lines of weakness may be created by creasing, mechanical scoring, laser scoring, stamping, cutting, perforating, or the like. Fold lines may be disposed between adjacent panels of the dispenser to facilitate folding of one panel relative to the other. As shown in the drawings, the dot-dashed lines labeled as 110, 112, 113, 116, 158, 160, 162, 164, 166, 168, 170, and 172 are examples of lines of weakness formed by creases that are suitable for folding.

It will be understood that the terms "first," "second," etc., may be used herein to describe various elements, components, regions, layers, and/or sections. These elements, components, regions, layers, and/or sections should not be limited by these terms. These terms are only used to distinguish one element, component, region, layer, or section from another element, component, region, layer, or a section. Thus, a first element, component, region, layer, or section discussed below could be termed a second element, component, region, layer, or section without departing from the teachings of exemplary aspects.

It is to be understood by one of ordinary skill in the art that the present discussion is a description of exemplary implementations only and is not intended as limiting the broader aspects of the present disclosure, which broader aspects are embodied in the exemplary construction.

Generally, a consumer product dispenser, such as a paper towel or facial tissue dispenser, is sold to a consumer in a configuration having a rectangular prism shape and houses a plurality of sheets formed from sheet material. The sheets can be interfolded for pop-up dispensing and formed into a stack. The stack sits within the dispenser and is configured for sheets to be pulled from the stack and out of the dispenser, normally one at a time. Dispensers may also store and dispense other stacked, sheet-like products, such as bags or foil.

In some implementations, the dispenser is formed from a blank made of a recyclable material, such as paperboard, and does not include a polymer baffle (also referred to as a plastic film) extending over the dispenser opening. Because the polymer baffle has to be removed from the dispenser before recycling the dispenser, this implementation of the dispenser is easier to recycle. Furthermore, because the polymer baffle has to be separately manufactured and adhered to the dispenser, not having the polymer baffle reduces manufacturing time and costs.

Various implementations include a dispenser for a plurality of sheets of sheet material. The dispenser includes a plurality of panels defining a cavity. The plurality of panels include a first panel and a second panel, folded relative to each other along at least one fold line. The first and second panels comprise a removable surfboard that extends between the first and second panels over the at least one fold line. The removable surfboard is defined by a perforated or weakened line on the first and second panels. The removable surfboard extends over a dispenser opening defined by the first panel and the second panel, and the dispenser opening is in communication with the cavity. In some aspects, the shape of the removable surfboard is coincident with the shape of the dispenser opening.

In some aspects, after the removable surfboard is removed from the first and second panels, the dispenser opening can hold one sheet of sheet material and prevent the sheet from falling back into the dispenser.

In some aspects, the dispenser opening is shaped and dimensioned relative to the sheets of material to prevent the dispenser from being lifted off a support surface when a sheet is pulled from the dispenser opening and reduces the likelihood of two or more sheets being dispensed at once.

In some aspects, the dispenser defines a dispenser opening that allows easier access to a sheet that has fallen back into the cavity.

According to various implementations, the dispenser is created by folding a blank—a flat sheet of material (e.g., paperboard) that is cut and provided with a plurality of fold lines—along the plurality of fold lines and coupling portions of the blank together (e.g., using adhesive).

For example, FIG. 1 shows a blank 100 for a dispenser for a plurality of sheets of sheet material, according to one implementation. The products may include sheet materials such as, for example, paper towels, facial tissues, bath tissue, or wipes that may be dispensed one sheet at a time from a dispenser.

The blank 100 includes a top panel 102 having a front edge **102*a* and a rear edge 102*b*, a front panel 104 having a top edge 104*a* and a bottom edge 104*b*, a rear panel 106 having a top edge 106*a* and a bottom edge 106*b*, and a bottom panel 108 having a front edge 108*a* and rear edge 108*b***.

The top edge **104*a* of the front panel 104 is coupled to the front edge 102*a* of the top panel 102 along a first fold line 110. The second edge 102*b* of the top panel 102 is coupled to the top edge 106*a* of the rear panel 106 along a second fold line 112. The bottom edge 104*b* of the front panel 104 is coupled to the front edge 108*a* of the bottom panel 108 along a third fold line 113**.

As shown in FIG. 1, the top panel 102 and the front panel 104 further include a removable surfboard 200. The removable surfboard 200 is defined by a perforated or weakened line 202 on the top panel 102 and the front panel. The removable surfboard 200 is chevron (or heart) shaped. In particular, a medial portion 204 of the removable surfboard 200 defined by the front panel 104 has an arcuate shaped portion that extends toward the fold line 110, and a medial portion 210 of the removable surfboard 200 defined by the top panel 102 has an arcuate shaped portion that extends away from the fold line 110. The dot-dash lines around a portion 205 of the removable surfboard 200 define a perforated or weakened line. This portion 205 of the removable surfboard 200 can be removed from the surfboard 200 and the dispenser. For example, a user can punch out this portion 205 of the removable surfboard 200 and insert the user's finger behind the removable surfboard 200 to separate the removable surfboard 200 from the dispenser 10. Lateral portions 206, 208 defined by the first panel 104 are disposed on either side of the medial portion 204 defined by the front panel 104. The lateral portions 206, 208 have a width $W_{LP}$ that is greater than a width $W_{MP}$ of the medial portion 204 defined by the front panel 104.

The removable surfboard 200 has a length $L_{RC}$ along the fold line 110 of about 60% to about 80% of a length of the fold line $L_{FL}$.

A maximum width of the portion of the removable surfboard 200 defined by the front panel 104, which is the width $W_{LP}$ of the lateral portions 206, 208 in FIG. 1, is about 35% to about 60% of a width WFP of the front panel 104. For example, in certain aspects, the width $W_{LP}$ of the lateral portions 206, 208 is about 40% to about 56% of the width WFP of the front panel 104.

The width $W_{LP}$ of the lateral portions 206, 208 of the removable surfboard 200 defined by the front panel 104 is about 2 to 3.5 times wider than the width $W_{MP}$ of the medial portion 204 of the removable surfboard 200 defined by the front panel 104.

The panels 102, 104, 106, 108 in FIG. 1 are rectangular shaped. However, in other implementations, one or more of the panels may have another shape, for example, a triangle, pentagon, hexagon, octagon, or another shape with three or more straight edges. In other implementations, one or more of the panels may have an irregular shape with arcuate portions. In other implementations, one or more of the panels may have a shape including both straight edges and arcuate portions formed together.

The blank 100 further includes a bottom tab 118 coupled to the rear edge **108*b* of the bottom panel 108 along a fourth fold line 116. The front edge 108*a* of the bottom panel 108 and the rear edge 108*b* of the bottom panel 108 are opposite and spaced apart from each other. The bottom tab 118 extends along the length of the rear edge 108*b*, but in other implementations, the bottom tab 118 may extend along a portion of the length of the rear edge 108*b*, or the bottom tab 118 may include a plurality of portions that are spaced apart along the length of the rear edge 108*b*. The bottom tab 118 is configured for being adhered or otherwise coupled to an inner surface of the rear panel 106 such that the bottom edge 106*b* of the rear panel 106 is adjacent to the rear edge 108*b* of the bottom panel 108**.

The blank 100 further includes a first upper sidewall portion 154 extending from the front panel 104 along a first front fold line 158 and a second upper sidewall portion 156 extending from the front panel 104 along a second front fold line 160. The first front fold line 158 and the second front fold line 160 are spaced apart from each other and intersect respective ends of the edges 104*b*, 104*a* of the front panel 104.

The blank 100 further includes a first lower sidewall portion 150 extending from the rear panel 106 along a first front fold line 166 and a second lower sidewall portion 152 extending from the rear panel 106 along a second rear fold line 168. The first rear fold line 166 and the second rear fold line 168 of the rear panel 106 are spaced apart from each other and intersect respective ends of the edges 106*a*, 106*b* of the rear panel 106.

The blank 100 further includes a first top panel tab 142 extending from the top panel 102 along a first top fold line 162 and a second top panel tab 144 extending from the top panel 102 along a second top fold line 164. The first and second top fold lines 162, 164 of the top panel 102 are spaced apart from each other and intersect respective ends of the edges 102*a*, 102*b* of the top panel 102.

The blank 100 further includes a first bottom panel tab 146 extending from the bottom panel 108 along a first bottom fold line 170 and a second bottom panel tab 148 extending from the bottom panel 108 along a second bottom fold line 172. The first and second bottom fold lines 170, 172 of the bottom panel 108 are spaced apart from each other and intersect respective ends of the edges 108*a*, 108*b* of the bottom panel 108.

The blank 100 includes adhesive areas 174. As shown in FIG. 1, the adhesive areas 174 appear on end portions of each tab 118, 142, 144, 146, 148 and the first and second lower sidewall portions 150, 152 of the rear panel 106. These areas 174 are illustrated with forward slashes in the figures. Adhesive applied to these areas is used to secure the blank in an assembled configuration, which is shown in FIGS. 2-9B and described below. In other implementations, the adhesive areas 174 may cover a greater portion of the tabs and sidewall portions, for example, such that adhesive covers substantially all of that particular surface. In other implementations, the adhesive areas 174 may cover a smaller portion of the abovementioned surfaces (e.g., small dots or areas of adhesive arranged in each surface).

The blank 100 may be printed or embossed/debossed with labeling, such as the brand of the tissues, the number of tissues within the dispenser, or other information that the consumer may want to know.

Figure 10:
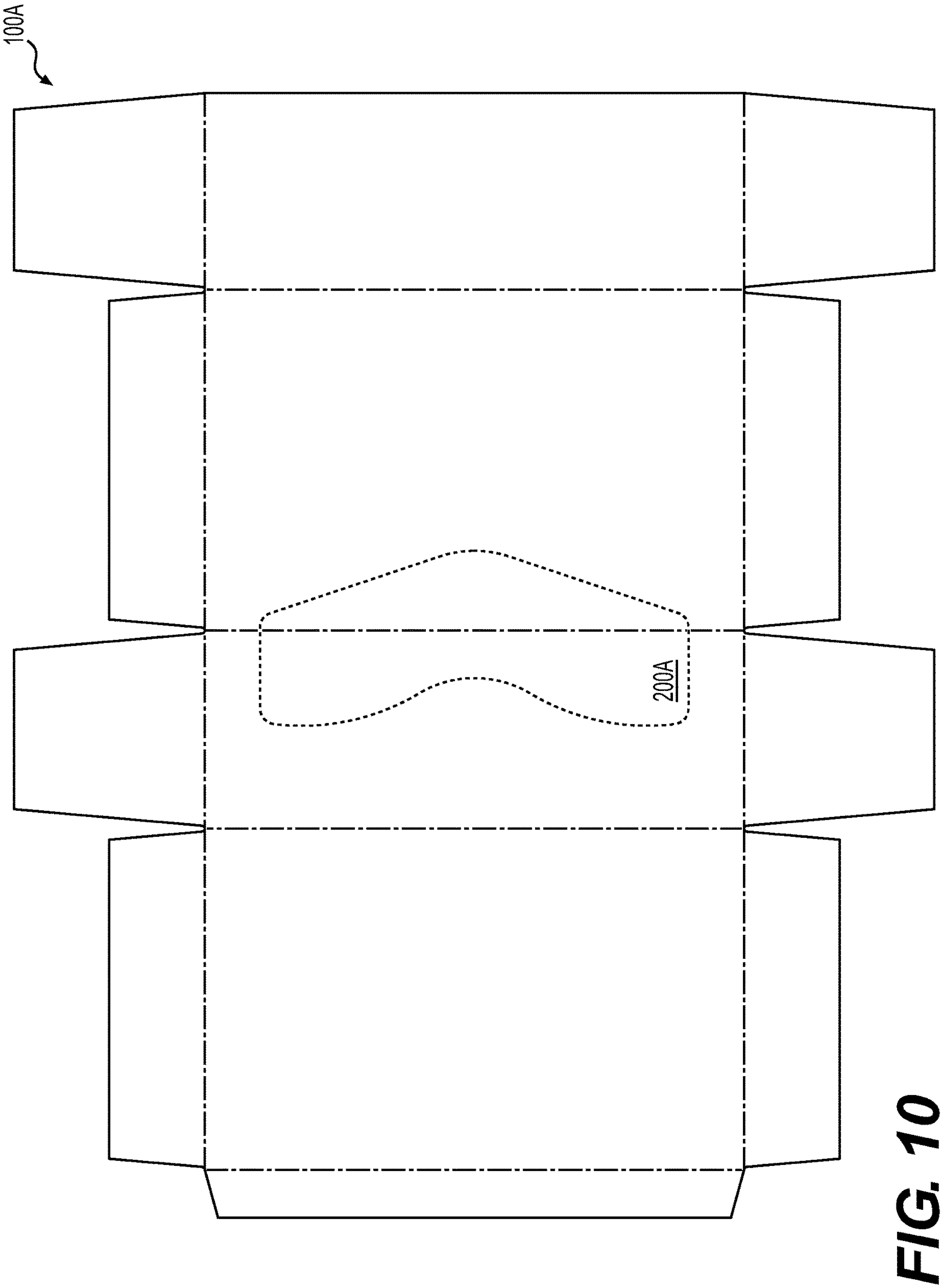
FIG. 10 shows a plan view of a blank for a dispenser, according to a second implementation.
Figure 11:
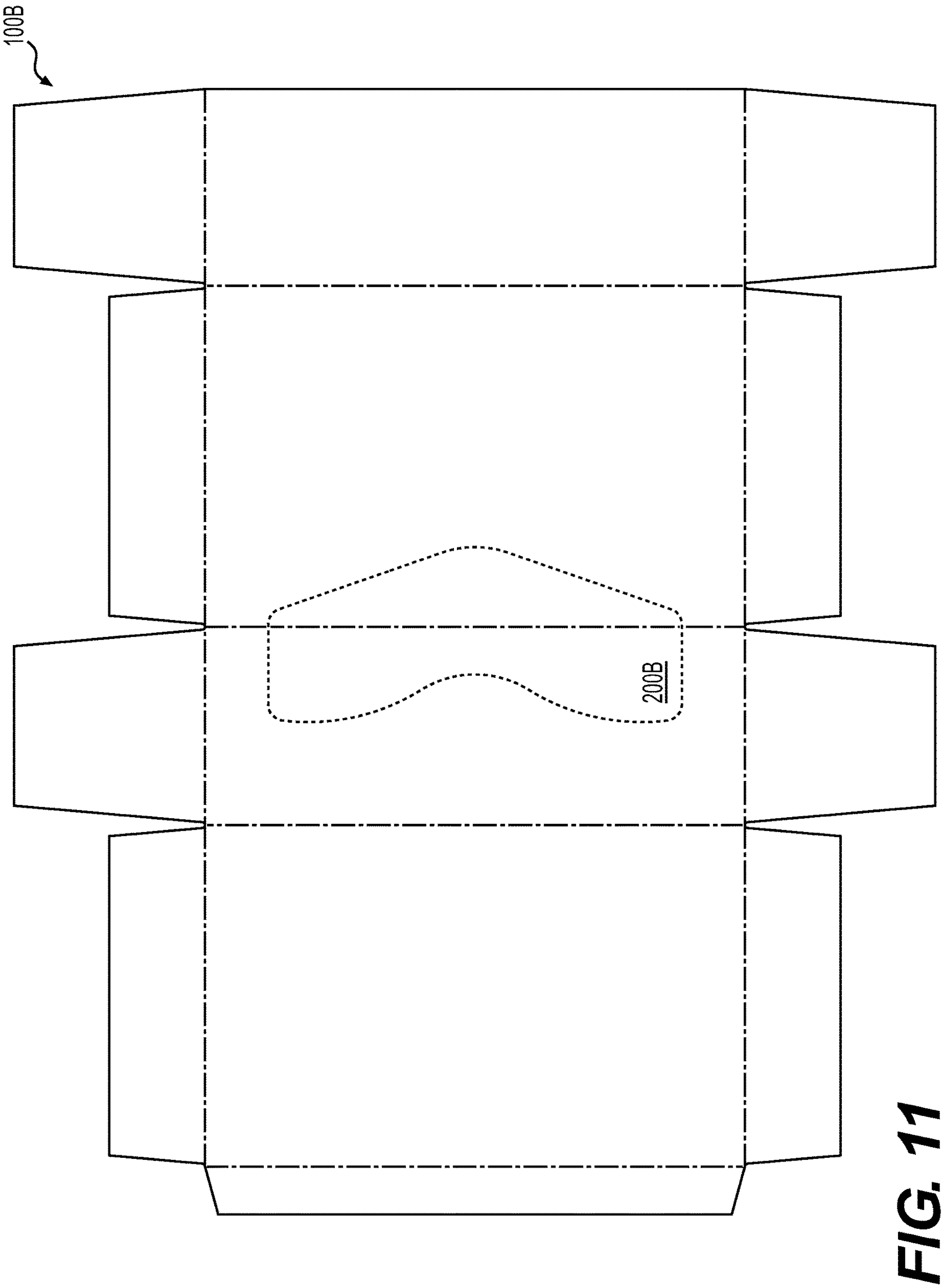
FIG. 11 shows a plan view of a blank for a dispenser, according to a third implementation.
Figure 12:
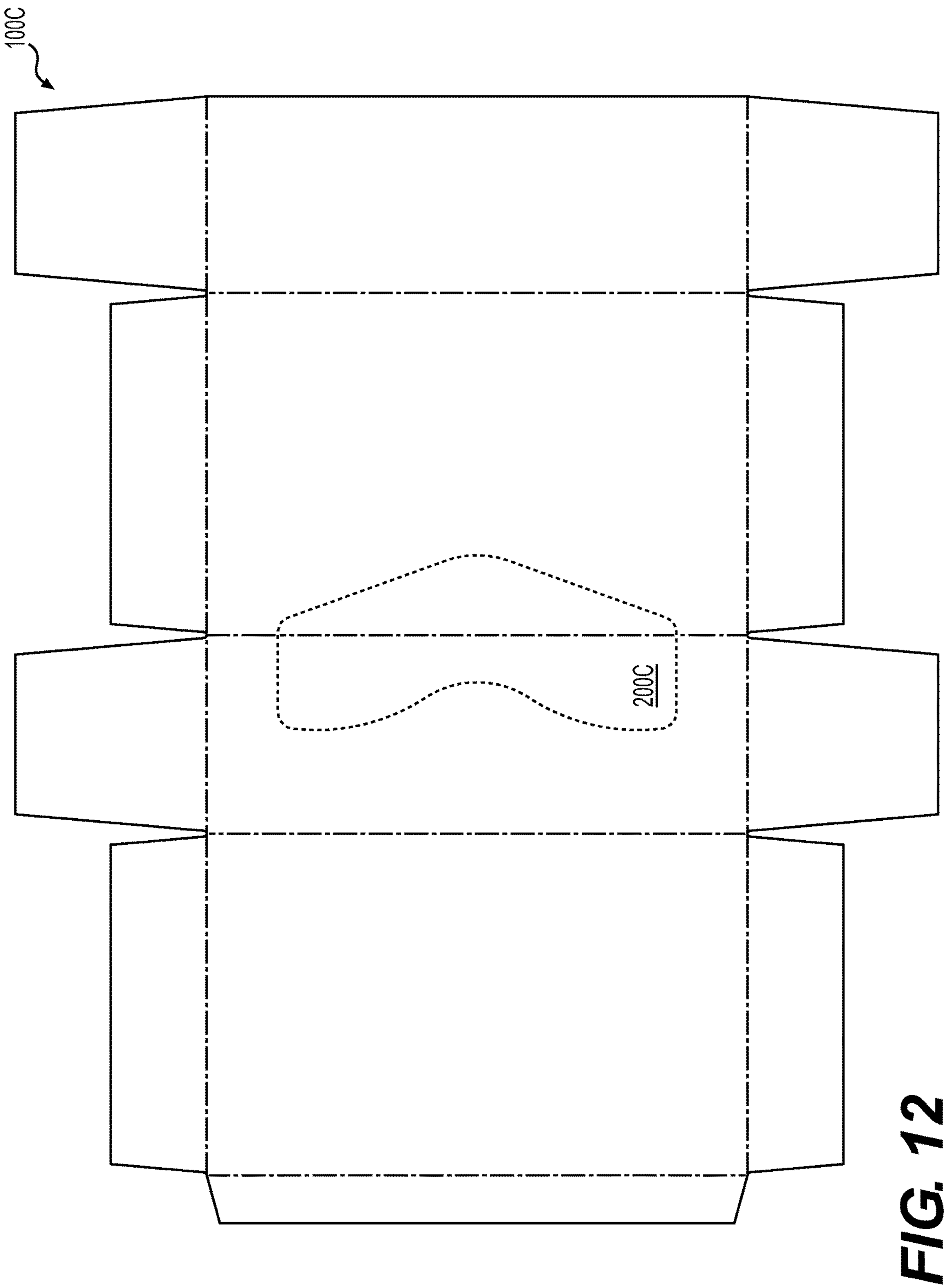
FIG. 12 shows a plan view of a blank for a dispenser, according to a fourth implementation.

In other implementations, the removable surfboard may have at least one different dimension relative to the top panel and the front panel (e.g., see FIGS. 10-12 and the table below) and/or other shapes (e.g., see FIGS. 13-19). For example, FIGS. 10-12 illustrate blanks 100A, 100B, and 100C having removable surfboards 200A, 200B, 200C, respectively. In the illustrated implementations, the removable surfboards 200A, 200B, and 200C each have at least one dimension that is different from the removable surfboard 200 of the blank 100 shown in FIG. 1.

Figure 13:
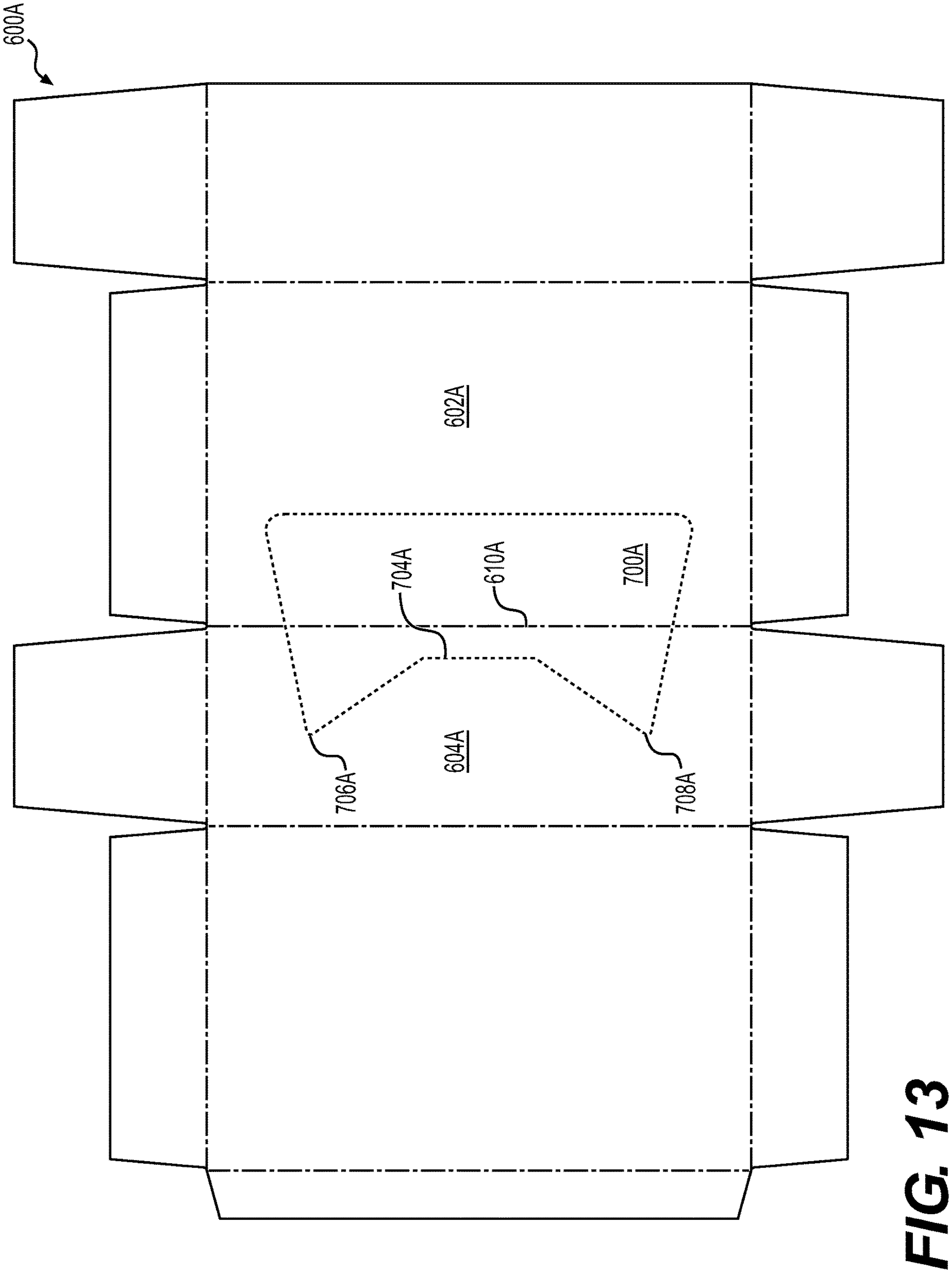
FIG. 13 shows a plan view of a blank for a dispenser, according to a fifth implementation.
Figure 14:
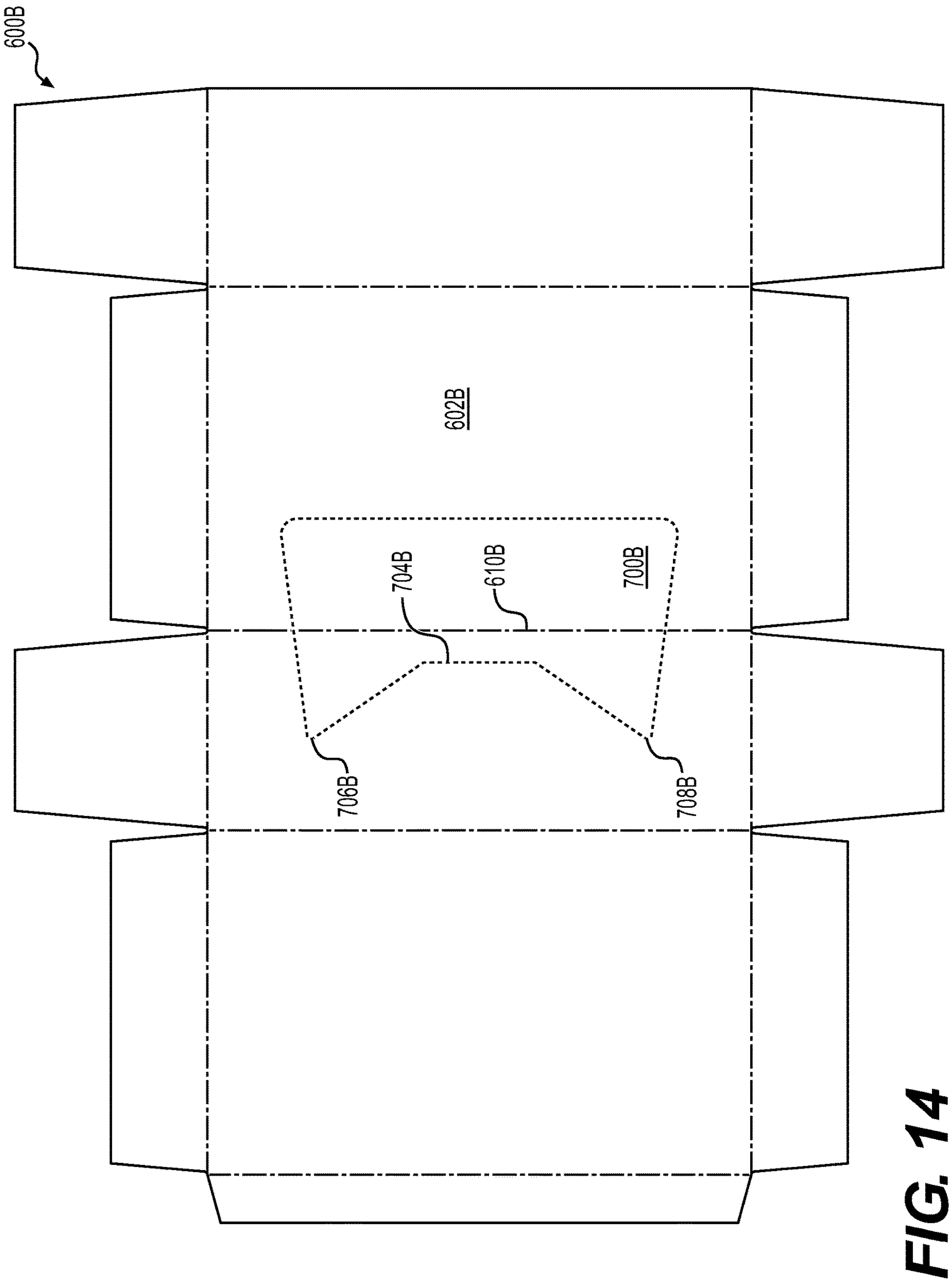
FIG. 14 shows a plan view of a blank for a dispenser, according to a sixth implementation.
Figure 15:
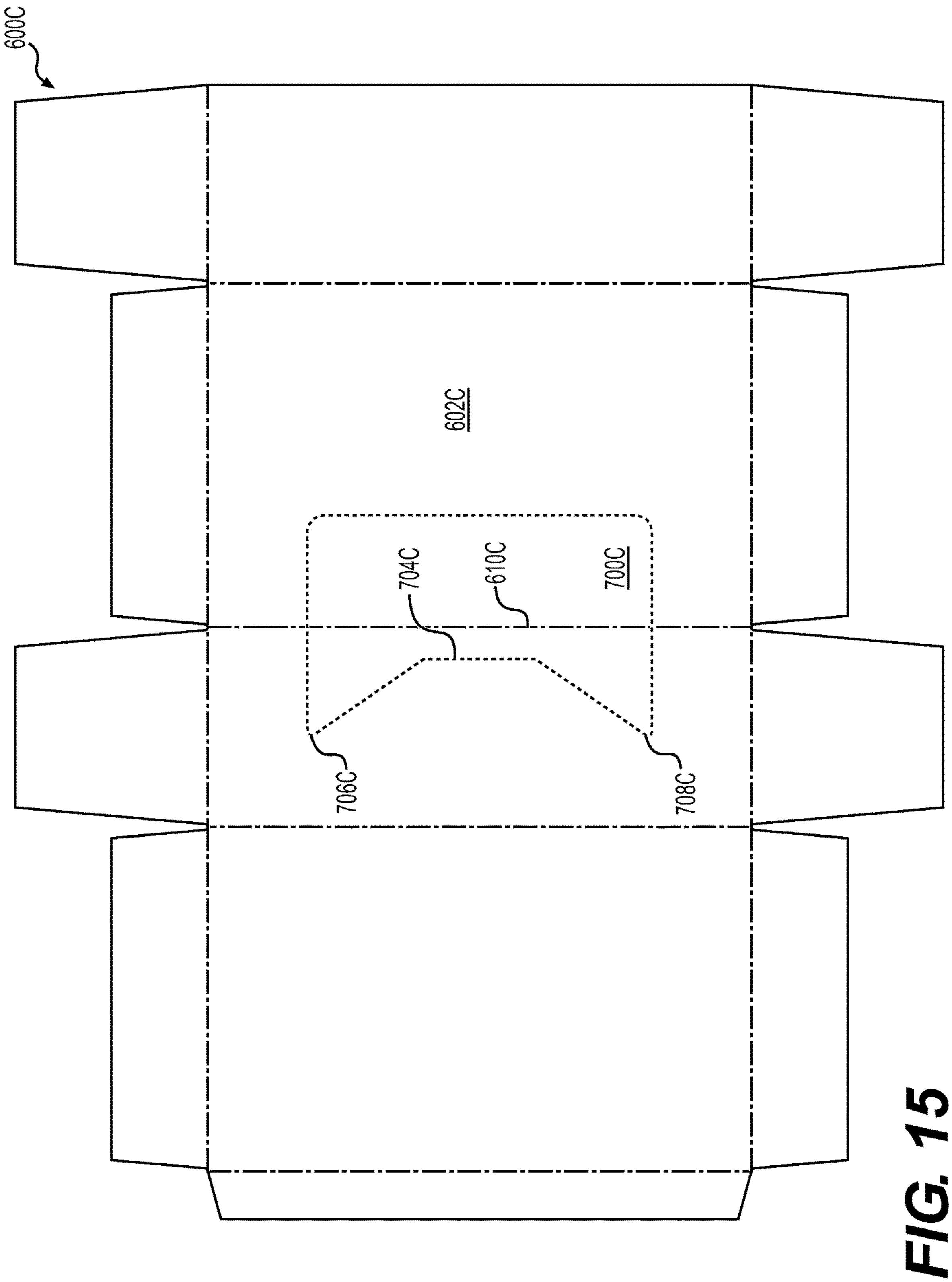
FIG. 15 shows a plan view of a blank for a dispenser, according to a seventh implementation.
Figure 16:
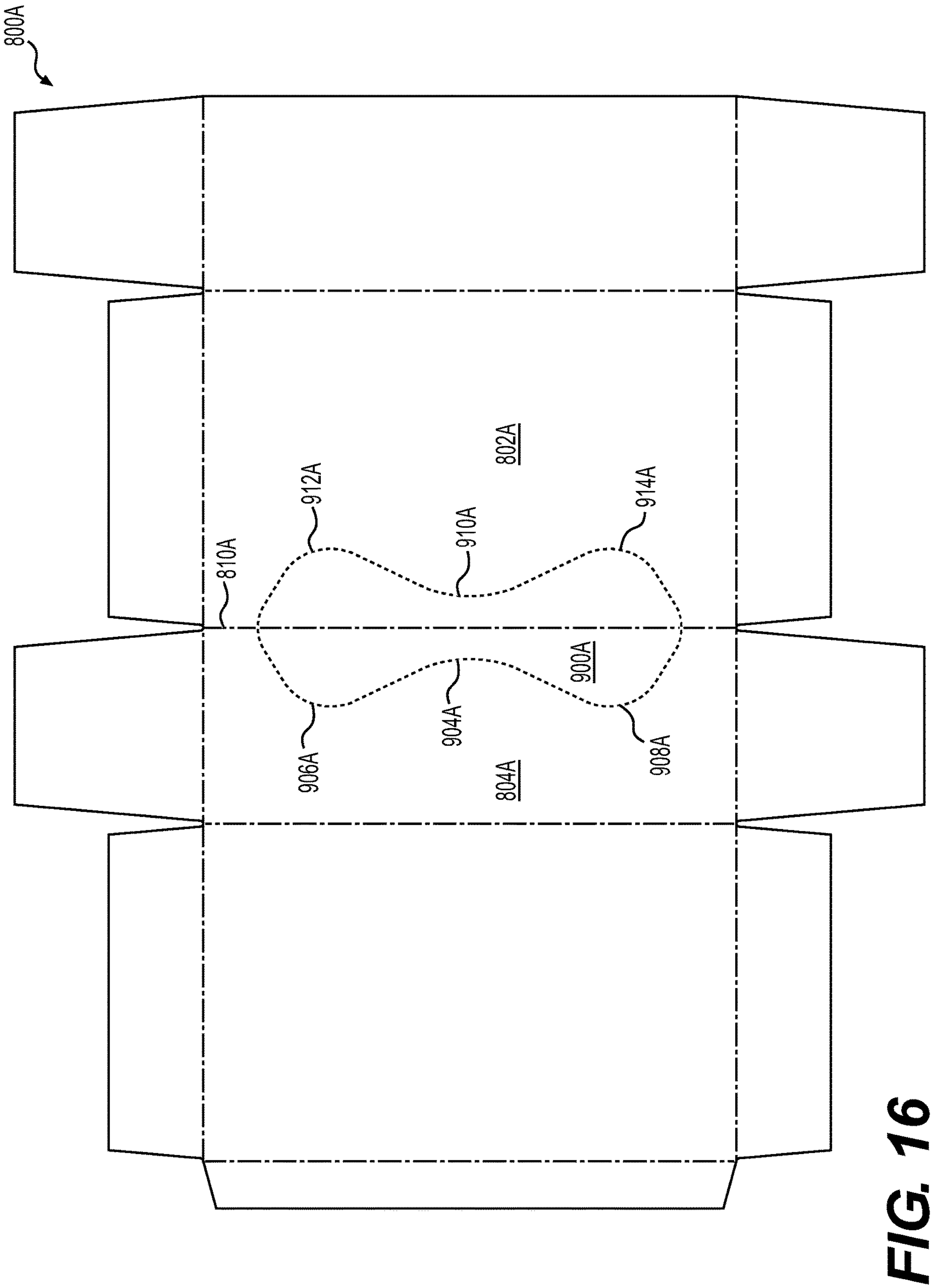
FIG. 16 shows a plan view of a blank for a dispenser, according to an eighth implementation.
Figure 17:
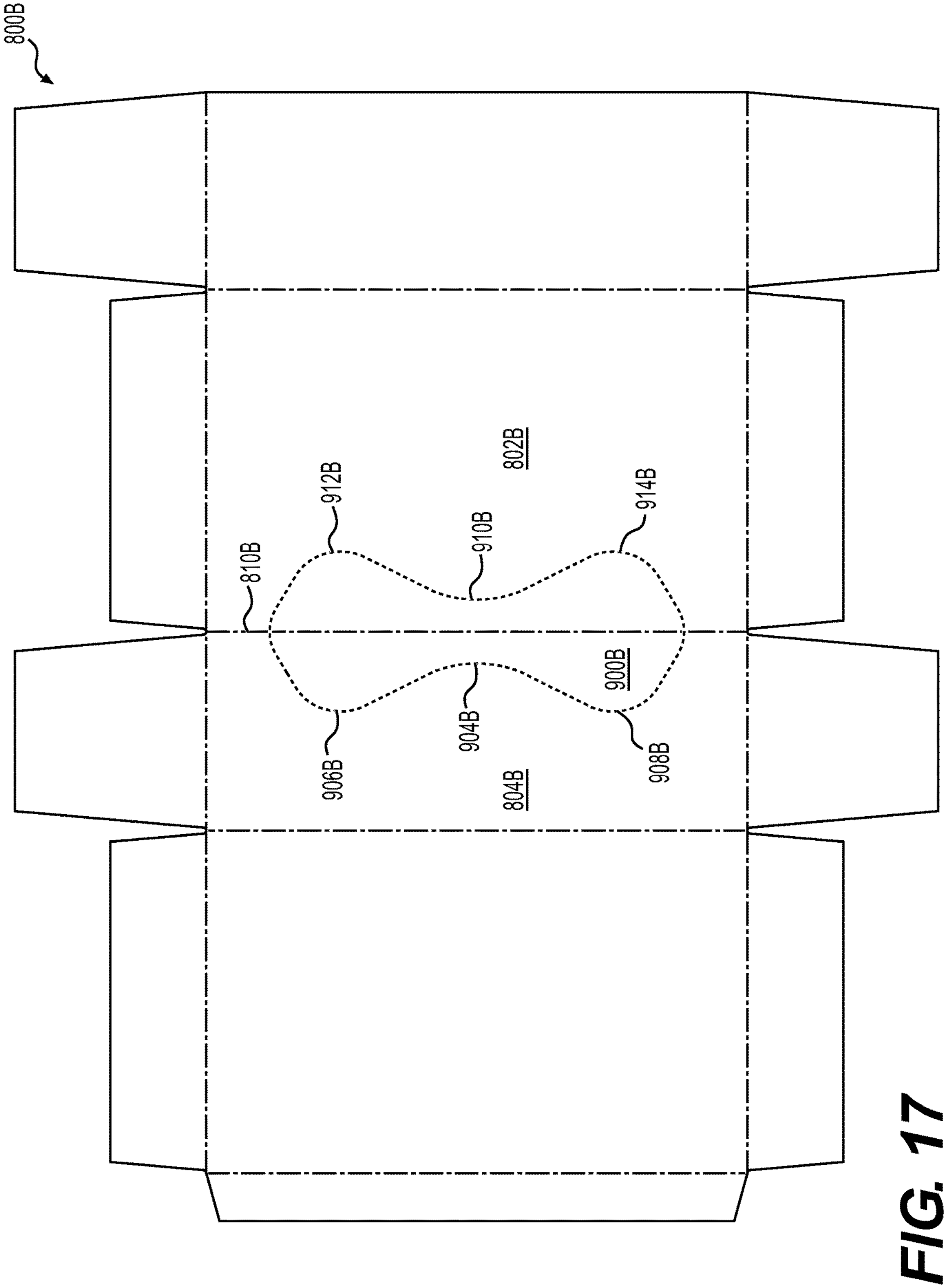
FIG. 17 shows a plan view of a blank for a dispenser, according to a ninth implementation.
Figure 18:
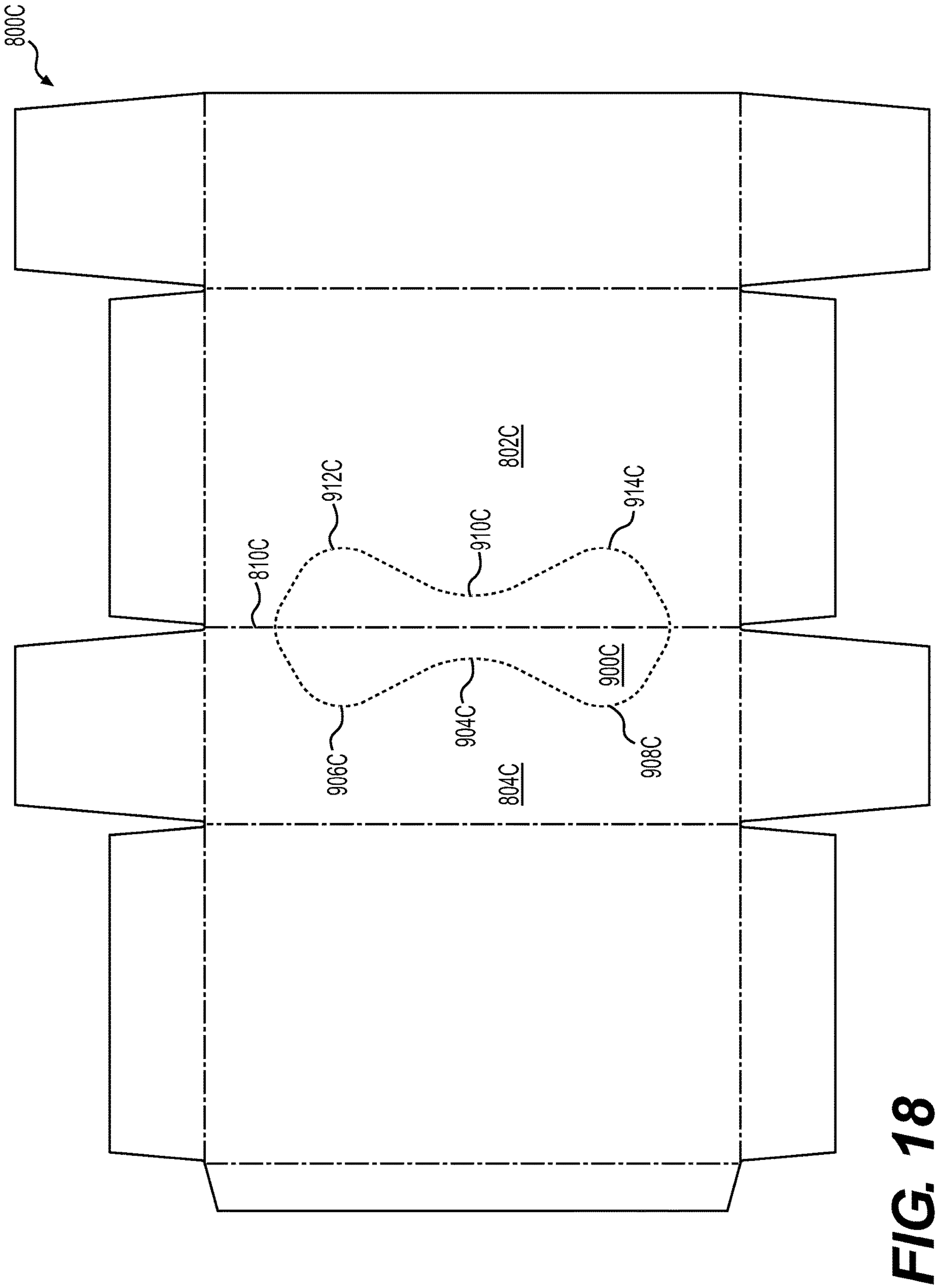
FIG. 18 shows a plan view of a blank for a dispenser, according to a tenth implementation.
Figure 19:
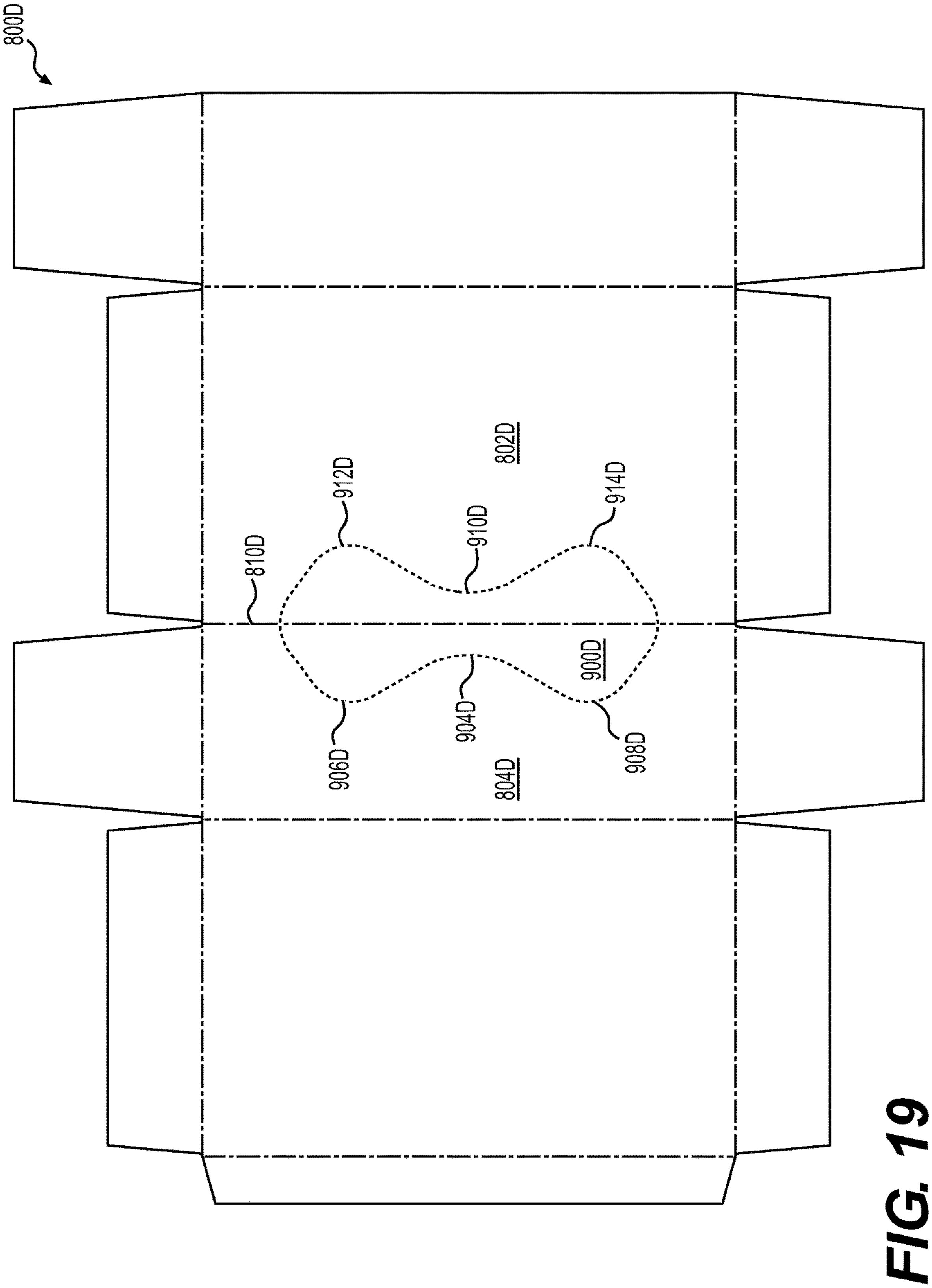
FIG. 19 shows a plan view of a blank for a dispenser, according to an eleventh implementation.

As another set of examples, FIGS. 13-15 illustrate blanks 600A, 600B, 600C having a crown shaped removable surfboard 700A, 700B, 700C, respectively. In FIGS. 13 and 14, a portion of the crown shaped removable surfboard 700A, 700B defined by the second panel 602A, 602B, respectively, is trapezoidal shaped. In FIG. 15, a portion of the crown shaped removable surfboard 700C defined by the second panel 602C is rectangular shaped. In each of FIGS. 13-15, medial portions 704A, 704B, 704C defined by the first panel 604A, 604B, 604C, respectively, are rectangular shaped. Lateral portions 706A, 708A, 706B, 708B, 706C, 708C defined by the first panel 604A, 604B, 604C, respectively, are triangular shaped, wherein an apex of each triangular shaped portion is spaced apart from the respective fold line 610A, 610B, 610C and extends in a direction normal to the fold line 610A, 610B, 610C. At least one dimension of the surfboards 700A, 700B, 700C differs from the others, as shown in the table below.

As another set of examples, FIGS. 16-19 illustrate blanks 800A, 800B, 800C, 800D having a peanut-shaped removable surfboard 900A, 900B, 900C, 900D, respectively. Each peanut shaped removable surfboard 900A, 900B, 900C, 900D has a central longitudinal axis that coincides with the fold line 810A, 810B, 810C, 810D, respectively. Medial portion 904A, 904B, 904C, 904D defined by the first panel 804A, 804B, 804C, 804D, respectively, and medial portion 910A, 910B, 910C, 910D defined by the second panel 802A, 802B, 802C, 802D are arcuate shaped portions that extend toward the fold line 810A, 810B, 810C, 810D, respectively. The lateral portions 906A, 908A, 906B, 908B, 906C, 908C, 906D, 908D defined by the first panel 804A, 804B, 804C, 804D and lateral portions 912A, 914A, 912B, 914B, 912C, 914C, 912D, 914D defined by the second panel 802A, 802B, 802C, 802D are arcuate shaped portions that extend away from the fold line 810A, 810B, 810C, 810D, respectively. At least one dimension of the surfboards 900A, 900B, 900C, 900D differs from the others, as shown in the table below.

Example values of the above noted dimensions (and other dimensions shown in FIG. 1), such as the width of a medial portion 210 defined by the top panel 102 ($W_{RC}$–$W_{MP}$), a width $W_{TP}$ of the top panel 102, and a maximum width $W_{MAXTP}$ of the portion of the removable surfboard 200 defined by the top panel 102, are listed below in the table for the blanks shown in FIGS. 1 and 10-19. The dimensions shown below are in inches. The labels for the dimensions shown in FIG. 1 also apply to the implementations shown in FIGS. 10-19.

| FIG. | $L_{FL}$ | $L_{RC}$ | $W_{RC}$ | $W_{LP}$ | $W_{MP}$ | $W_{FP}$ | $W_{RC}$ – $W_{MP}$ | $W_{TP}$ | $W_{MAX\ TP}$ | $L_{RC}$/ $L_{FL}$ | $W_{LP}$/ $W_{MP}$ | $W_{LP}$/ $W_{FP}$ | ($W_{RC}$ – $W_{MP}$)/ $W_{TP}$ |
|---|---|---|---|---|---|---|---|---|---|---|---|---|---|
| 1 | 8.50 | 6.75 | 3.25 | 1.50 | 0.75 | 3.13 | 1.75 | 5.38 | 1.75 | 0.79 | 2.00 | 0.48 | 0.33 |
| 10 | 8.50 | 6.75 | 2.75 | 1.50 | 0.75 | 3.13 | 1.25 | 5.38 | 1.25 | 0.79 | 2.00 | 0.48 | 0.23 |
| 11 | 8.50 | 6.50 | 2.75 | 1.50 | 0.75 | 3.13 | 1.25 | 5.38 | 1.25 | 0.76 | 2.00 | 0.48 | 0.23 |
| 12 | 8.50 | 6.25 | 2.75 | 1.50 | 0.75 | 3.13 | 1.25 | 5.38 | 1.25 | 0.74 | 2.00 | 0.48 | 0.23 |
| 13 | 8.50 | 6.75 | 3.50 | 1.75 | 0.50 | 3.13 | 1.75 | 5.38 | 1.75 | 0.79 | 3.50 | 0.56 | 0.33 |
| 14 | 8.50 | 6.25 | 3.50 | 1.75 | 0.50 | 3.13 | 1.75 | 5.38 | 1.75 | 0.74 | 3.50 | 0.56 | 0.33 |
| 15 | 8.50 | 5.38 | 3.50 | 1.75 | 0.50 | 3.13 | 1.75 | 5.38 | 1.75 | 0.63 | 3.50 | 0.56 | 0.33 |
| 16 | 8.50 | 6.75 | 2.50 | 1.25 | 0.50 | 3.13 | 0.50 | 5.38 | 1.25 | 0.79 | 2.50 | 0.40 | 0.23 |
| 17 | 8.50 | 6.50 | 2.50 | 1.25 | 0.50 | 3.13 | 0.50 | 5.38 | 1.25 | 0.76 | 2.50 | 0.40 | 0.23 |

-continued

| FIG. | $L_{FL}$ | $L_{RC}$ | $W_{RC}$ | $W_{LP}$ | $W_{MP}$ | $W_{FP}$ | $W_{RC} - W_{MP}$ | $W_{TP}$ | $W_{MAX\ TP}$ | $L_{RC}/L_{FL}$ | $W_{LP}/W_{MP}$ | $W_{LP}/W_{FP}$ | $(W_{RC} - W_{MP})/W_{TP}$ |
|---|---|---|---|---|---|---|---|---|---|---|---|---|---|
| 18 | 8.50 | 6.25 | 2.50 | 1.25 | 0.50 | 3.13 | 0.50 | 5.38 | 1.25 | 0.74 | 2.50 | 0.40 | 0.23 |
| 19 | 8.50 | 6.00 | 2.50 | 1.25 | 0.50 | 3.13 | 0.50 | 5.38 | 1.25 | 0.71 | 2.50 | 0.40 | 0.23 |

The blank 100 is configured to be folded, creased, and/or glued together to form a dispenser, such as dispenser 10 shown in FIGS. 2-9B. The formation of dispenser 10 using the blank 100 includes the following steps, according to certain implementations:

(i) folding the front panel 104 relative to the top panel 102 along the first folding line 110 in a first direction, wherein the first direction is a direction away from a surface (shown in the plan view in FIG. 1) of the blank that is to be the outer surface of the dispenser;

(ii) folding the rear panel 106 relative to the top panel 102 along the second fold line 112 in the first direction;

(iii) folding the bottom panel 108 relative to the front panel 104 along the third fold line 113 in the first direction;

(iv) folding the sidewall portions 154, 156 extending from the front panel 104 along the respective side fold lines 158, 160 in the first direction;

(v) folding the sidewall portions 150, 152 extending from the rear panel 106 along the respective side fold lines 166, 168 in the first direction;

(vi) folding the first and second tabs 146, 148 extending from the bottom panel 108 along the respective side fold lines 170, 172 the first direction;

(vii) folding the first and second tabs 142, 144 relative to the top panel 102 along the respective side fold lines 162, 164 in the first direction;

(viii) adhering the bottom tab 118 and an inner surface of the rear panel 106 such that the bottom edge 106*b* of the rear panel 106 and the rear edge 108*b* of the bottom panel 108 are adjacent to each other and the fourth fold line 116.

(ix) adhering the first lower sidewall portion 150 and the first upper sidewall portion 154 such that the first side tabs 142, 146 are disposed inward of the first lower sidewall portion 150 and the first upper sidewall portion 154; and (x) adhering the second lower sidewall portion 152 and the second upper sidewall portion 156 such that the second side tabs 144, 148 are disposed inward of the second lower sidewall portion 152 and the second upper sidewall portion 156. The upper sidewall portions 154, 156 and lower sidewall portions 150, 152 are adhered together to form end sidewalls on each end of the dispenser 10. These sidewall portions 150, 152, 154, 156 may also be adhered to the respective side panel tabs 142, 144, 146, 148.

Before at least one end sidewall is adhered together, an opening defined by these portions is used to insert the stack of sheet material into the cavity of the dispenser 10. These steps may be performed in the order listed, but the steps may be performed in another suitable order according to other implementations.

A plurality of sheets of sheet-material 50, such as paper towels, facial tissue sheets, or bath tissue sheets, can be pulled from dispenser 10, which is shown in FIGS. 2-9B. To access the sheets 50, a user removes the removable surfboard 200 by separating it from the top panel 102 and the front panel 104 along the perforated line 202. Upon removal of the removable surfboard 200, a dispenser opening 40, which has the same shape at the removable surfboard 200, is defined by the panels 102, 104. The sheets 50 can be pulled out of the dispenser 10 through the dispenser opening 40.

FIGS. 2-9B show various views of the assembled dispenser 10. The dispenser 10 generally has a rectangular prism shape.

Figure 9A:
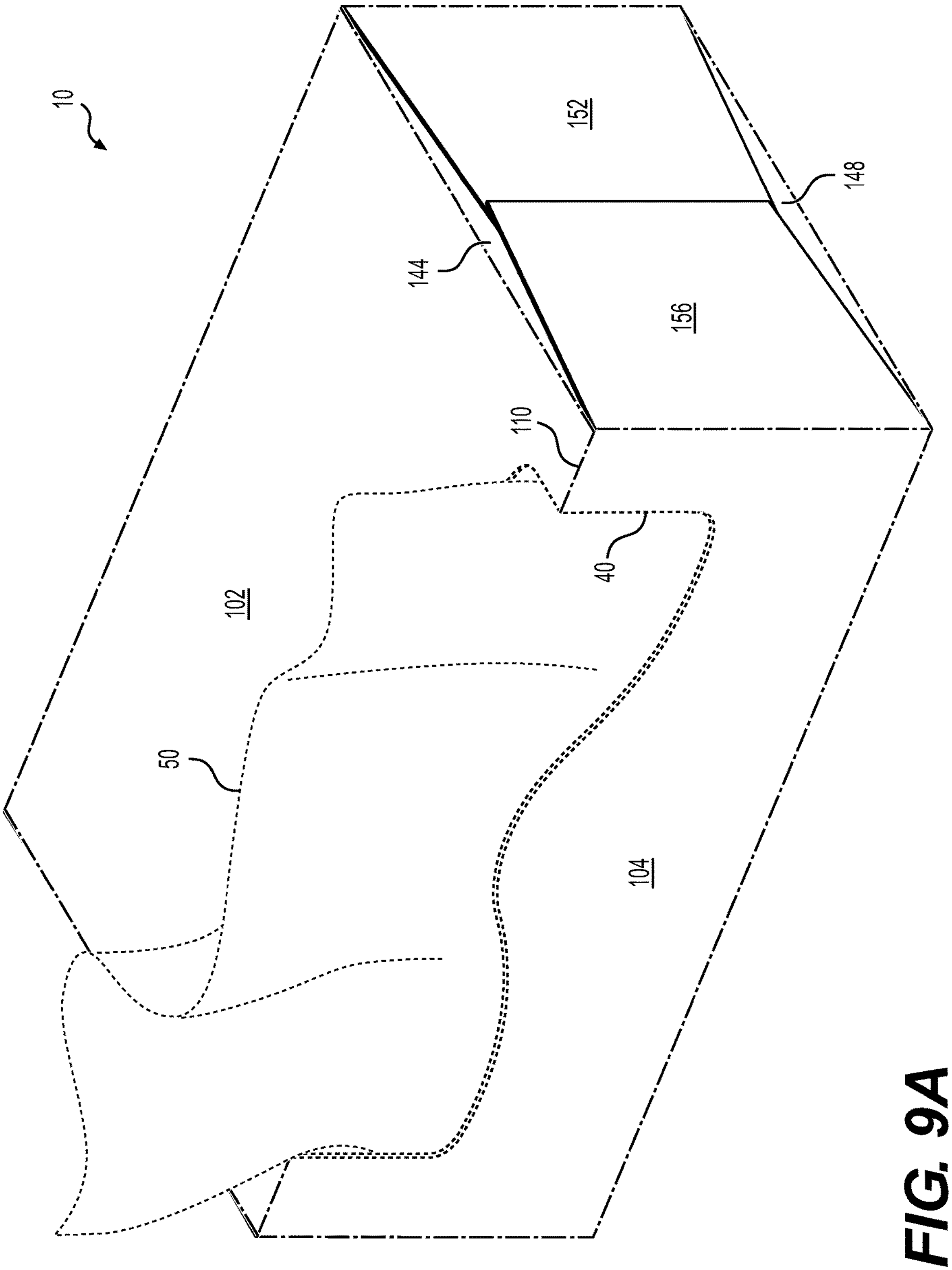
FIG. 9A shows a perspective view of the dispenser in FIG. 2 with the removable surfboard removed and a sheet extending through the dispenser opening.
Figure 9B:
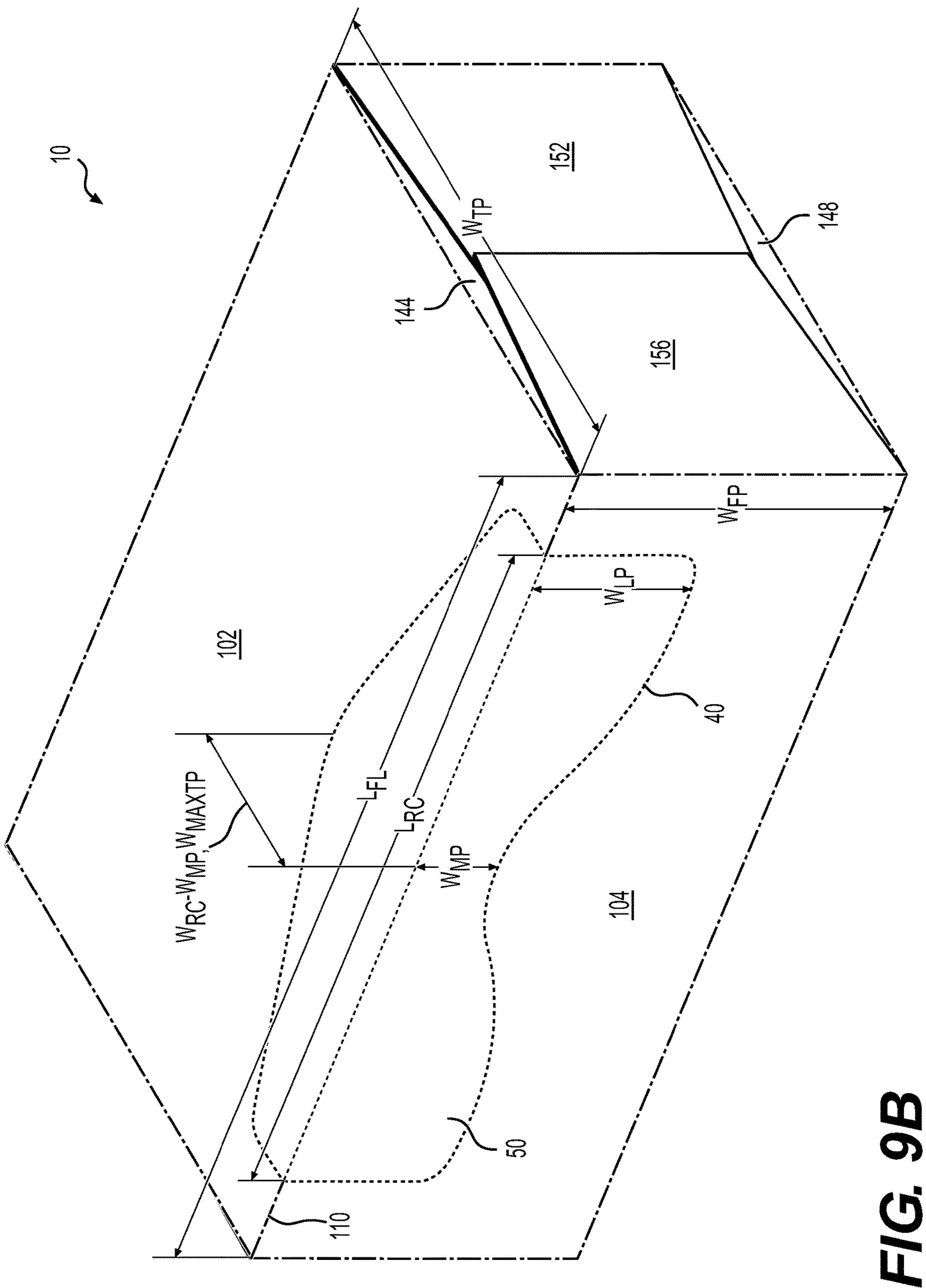
FIG. 9B shows a perspective view of the dispenser in FIG. 2 with the removable surfboard removed.

As seen in FIG. 9A, one sheet 50 may extend out of the dispenser 10 to be grabbed and pulled away from the dispenser 10. The remaining sheets are held within the dispenser 10, which is not shown. In the implementation shown in FIG. 9A, the rear panel 106 or the bottom panel 108 may be placed on the support surface. In some implementations, the remaining sheets are interfolded and held within the dispenser in a stack for pop-up dispensing. Pop-up dispensing allows a next remainder sheet to be pulled through the dispenser opening 40 and extend out of the dispenser 10, ready to be pulled away just like the sheet before it. FIG. 9B illustrates a perspective view of the dispenser 10 with the removable surfboard removed and the dispenser opening 40 shown.

According to some aspects, such as in implementations in which the dispenser opening 40 and the removable surfboard 200 have shapes that coincide, the dispensing performance of the dispenser 10 is optimized by having the length of the dispenser opening 40 be 60% to 80% of the length $L_{FL}$ of the fold line 110 and having lateral portions of the removable surfboard 200 and dispenser opening 40 defined by the front panel 104 that are wider than a medial portion defined by the front panel. These features allow for one-handed pulling of sheets, prevent fall back of sheets back into the dispenser, and provide easier access to sheets that may fall back into the dispenser. In addition, having a maximum width of the dispense opening 40 defined by the front panel 104 be about 35% to about 60% of the width of the front panel 104 allows the user to access any sheets that fall back into the dispenser. Furthermore, having a medial portion of the dispenser opening 40 defined by the top panel 102 and/or front panel 104 that has a width as measured from the fold line 110 that is different than a width of the lateral portions of the opening 40 defined by the top panel 102 and/or front panel 104 helps to maintain the sheet 50 in a propped up position relative to the stack of sheets.

A number of example implementations are provided herein. However, it is understood that various modifications can be made without departing from the spirit and scope of the disclosure herein.

Disclosed are materials, systems, devices, methods, compositions, and components that can be used for, can be used in conjunction with, can be used in preparation for, or are products of the disclosed methods, systems, and devices. These and other components are disclosed herein, and it is understood that when combinations, subsets, interactions, groups, etc. of these components are disclosed that while specific reference of each various individual and collective combinations and permutations of these components may not be explicitly disclosed, each is specifically contemplated and described herein. For example, if a device is disclosed and discussed each and every combination and permutation of the device are disclosed herein, and the modifications that are possible are specifically contemplated unless specifically indicated to the contrary. Likewise, any subset or combination of these is also specifically contemplated and disclosed. This concept applies to all aspects of this disclosure including, but not limited to, steps in methods using the disclosed systems or devices. Thus, if there are a variety of additional steps that can be performed, it is understood that each of these additional steps can be performed with any specific method steps or combination of method steps of the disclosed methods, and that each such combination or subset of combinations is specifically contemplated and should be considered disclosed.

The invention claimed is:

1. A dispenser for a plurality of sheets of sheet material, the dispenser comprising:

a plurality of panels defining a cavity, the plurality of panels comprising a first panel and a second panel folded relative to each other along at least one fold line, the first panel and the second panel comprising at least one removable surfboard that extends between the first panel and the second panel over the at least one fold line, wherein the removable surfboard has a length along the fold line of about 60% to about 80% of a length of the fold line, and the removable surfboard has a medial portion and lateral portions disposed on opposite sides of the medial portion, wherein the lateral portions of the removable surfboard defined by the first panel have a width that is greater than a width of the medial portion of the removable surfboard defined by the first panel.

2. The dispenser of claim 1, wherein the length of the removable surfboard along the fold line is about 70% to about 80% of the length of the fold line.

3. The dispenser of claim 1, wherein a maximum width of a portion of the removable surfboard defined by the first panel is about 35% to about 60% of a width of the first panel.

4. The dispenser of claim 3, wherein the maximum width of the portion of the removable surfboard defined by the first panel is about 40% to about 56% of the width of the first panel.

5. The dispenser of claim 1, wherein a maximum width of the lateral portions of the removable surfboard defined by the first panel is about 2 to about 3.5 times wider than a minimum width of the medial portion of the removable surfboard defined by the first panel.

6. The dispenser of claim 1, wherein the removable surfboard is defined by a perforated or weakened line on the first panel and second panel.

7. The dispenser of claim 1, wherein the removable surfboard extends over a dispenser opening defined by the first panel and the second panel, the dispenser opening being in communication with the cavity, wherein a shape of the removable surfboard is coincident with a shape of the dispenser opening.

8. The dispenser of claim 1, wherein the removable surfboard is chevron shaped when removed from the dispenser and laid flat, wherein the medial portion of the removable surfboard defined by the first panel has an arcuate shaped portion that extends toward the fold line, and a medial portion of the removable surfboard defined by the second panel has an arcuate shaped portion that extends away from the fold line.

9. The dispenser of claim 1, wherein the removable surfboard is peanut shaped when removed from the dispenser and laid flat, wherein a central longitudinal axis of the peanut shaped removable surfboard coincides with the fold line, and the medial portion of the removable surfboard defined by the first panel and a medial portion of the removable surfboard defined by the second panel are arcuate shaped portions that extend toward the fold line, and the lateral portions of the removable surfboard defined by the first panel and lateral portions of the removable surfboard defined by the second panel are arcuate shaped portions that extend away from the fold line.

10. The dispenser of claim 1, wherein a portion of the removable surfboard defined by the second panel is trapezoidal or rectangular shaped and the lateral portions of the removable surfboard defined by the first panel are triangular shaped, wherein an apex of each triangular shaped portion is spaced apart from the fold line and extends in a direction normal to the fold line.

11. The dispenser of claim 10, wherein the medial portion of the removable surfboard defined by the first panel is rectangular shaped.

12. The dispenser of claim 1, wherein the first panel is a front panel, and the second panel is a top panel, and the dispenser further comprises:

a rear panel opposite the front panel and extending from an opposite edge of the top panel;

a bottom panel opposite the top panel and extending between opposite edges of the front panel and the rear panel than the top panel;

first side flaps that extend from the front panel and the rear panel and overlap each other to at least partially enclose a first side of the dispenser; and second side flaps that extend from the front panel and the rear panel and overlap each other to at least partially enclose a second side of the dispenser, the first side and the second sides of the dispenser being opposite from each other.

13. The dispenser of claim 1, wherein the panels are rectangular shaped.

14. The dispenser of claim 1, wherein the dispenser is free of a polymer baffle.

15. A blank for a dispenser for a plurality of sheets of sheet material, the blank comprising:

a plurality of panels, the plurality of panels comprising a first panel and a second panel coupled to the first panel along at least one fold line, the first and second panels comprising at least one removable surfboard that extends between the first and second panels over the at least one fold line, wherein the removable surfboard has a length along the fold line of about 60% to about 80% of a length of the fold line, and the removable surfboard has a medial portion and lateral portions disposed on opposite sides of the medial portion, wherein the lateral portions of the removable surfboard defined by the first panel have a width that is greater than a width of the medial portion of the removable surfboard defined by the first panel.

16. The blank of claim 15, wherein the length along the fold line of the removable surfboard is about 70% to about 80% of the length of the fold line.

17. The blank of claim 15, wherein a maximum width of a portion of the removable surfboard defined by the first panel is about 35% to about 60% of a width of the first panel.

18. The blank of claim 17, wherein the maximum width of the portion of the removable surfboard defined by the first panel is about 40% to about 56% of the width of the first panel.

19. The blank of claim 15, wherein a maximum width of the lateral portions of the removable surfboard defined by the first panel is about 2 to about 3.5 times wider than a minimum width of the medial portion of the removable surfboard defined by the first panel.

20. The blank of claim 15, wherein the removable surfboard is defined by a perforated or weakened line on the first panel and second panel.

21. The blank of claim 15, wherein the removable surfboard is chevron shaped, wherein the medial portion of the removable surfboard defined by the first panel is arcuate shaped and extends toward the fold line, and a medial portion of the removable surfboard defined by the second panel is arcuate shaped and extends away from the fold line.

22. The blank of claim 15, wherein the removable surfboard is peanut shaped, wherein a central longitudinal axis of the peanut shaped removable surfboard coincides with the fold line, and the medial portion of the removable surfboard defined by the first panel and a medial portion of the removable surfboard defined by the second panel are arcuate shaped portions that extend toward the fold line, and the lateral portions of the removable surfboard defined by the first panel and lateral portions of the removable surfboard defined by the second panel are arcuate shaped portions that extend away from the fold line.

23. The blank of claim 15, wherein a portion of the removable surfboard defined by the second panel is trapezoidal or rectangular shaped and the lateral portions of the removable surfboard defined by the first panel are triangular shaped, wherein an apex of each triangular shaped portion is spaced apart from the fold line and extends in a direction normal to the fold line.

24. The blank of claim 23, wherein the medial portion of the removable surfboard defined by the first panel is rectangular shaped.

25. The blank of claim 15, wherein the first panel is a front panel, the second panel is a top panel, and the fold line is a first fold line, the blank further comprises:

a rear panel extending from the top panel along a second fold line that is opposite and spaced apart from the first fold line;

a bottom panel extending from the front panel along a third fold line that is opposite and spaced apart from the first fold line; and first and second front panel side flaps that extend from each side of the front panel and first and second rear panel side flaps that extend from each side of the rear panel.

26. The blank of claim 15, wherein the panels are rectangular shaped.

* * * * *